(12) United States Patent
Wakino

(10) Patent No.: US 11,347,430 B2
(45) Date of Patent: May 31, 2022

(54) OPERATION PROCESSING APPARATUS THAT EXECUTES HIERARCHICAL CALCULATION, OPERATION PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Shiori Wakino, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 16/916,334

(22) Filed: Jun. 30, 2020

(65) Prior Publication Data

US 2021/0011653 A1 Jan. 14, 2021

(30) Foreign Application Priority Data

Jul. 8, 2019 (JP) .............................. JP2019-127080

(51) Int. Cl.
*G06T 1/60* (2006.01)
*G06F 3/06* (2006.01)
*G06N 3/08* (2006.01)

(52) U.S. Cl.
CPC .......... *G06F 3/0655* (2013.01); *G06F 3/0604* (2013.01); *G06F 3/0679* (2013.01); *G06N 3/084* (2013.01); *G06T 1/60* (2013.01)

(58) Field of Classification Search
CPC ......... G06T 1/60; G06N 3/084; G06F 3/0604; G06F 3/0655; G06F 3/0679
(Continued)

(56) References Cited

U.S. PATENT DOCUMENTS 8,391,306 B2   3/2013  Ito
9,665,799 B1 *  5/2017  Munteanu ............ G06K 9/6272
(Continued)

FOREIGN PATENT DOCUMENTS

JP         S6162187 A    3/1986
JP         5368687 B2   12/2013

OTHER PUBLICATIONS

LeCun "Convolutional Networks and Applications in Vision." Proceedings of IEEE International Symposium on Circuits and Systems. 2010: pp. 253-256. Cited in the specification.
(Continued)

*Primary Examiner* — Jacinta M Crawford
(74) *Attorney, Agent, or Firm* — Rossi, Kimms & McDowell LLP

(57) ABSTRACT

An apparatus for calculating feature planes by hierarchically performing filter operation processing for input image data, comprises an operation unit configured to perform a convolution operation, a holding unit including memories configured to store image data and an operation result of the operation unit, a unit configured to receive the operation result, and write, out of the operation result, data of successive lines of the same feature plane in different memories of the memories and write data at the same coordinates of feature planes in the same layer in different memories of the memories, and a unit configured to read out the data of the successive lines from the different memories, read out the data at the same coordinates of the different feature planes in the same layer, and transmit the data to the operation unit.

7 Claims, 17 Drawing Sheets

(58) Field of Classification Search
USPC .......................................................... 345/530
See application file for complete search history.

(56) References Cited

U.S. PATENT DOCUMENTS

2019/0095130 A1* 3/2019 Xu .......................... G06F 3/0656
2019/0361620 A1* 11/2019 Sasamoto ................ G06N 3/04

OTHER PUBLICATIONS

Copending U.S. Appl. No. 16/916,507, filed Jun. 30, 2020.

* cited by examiner

F I G. 3B
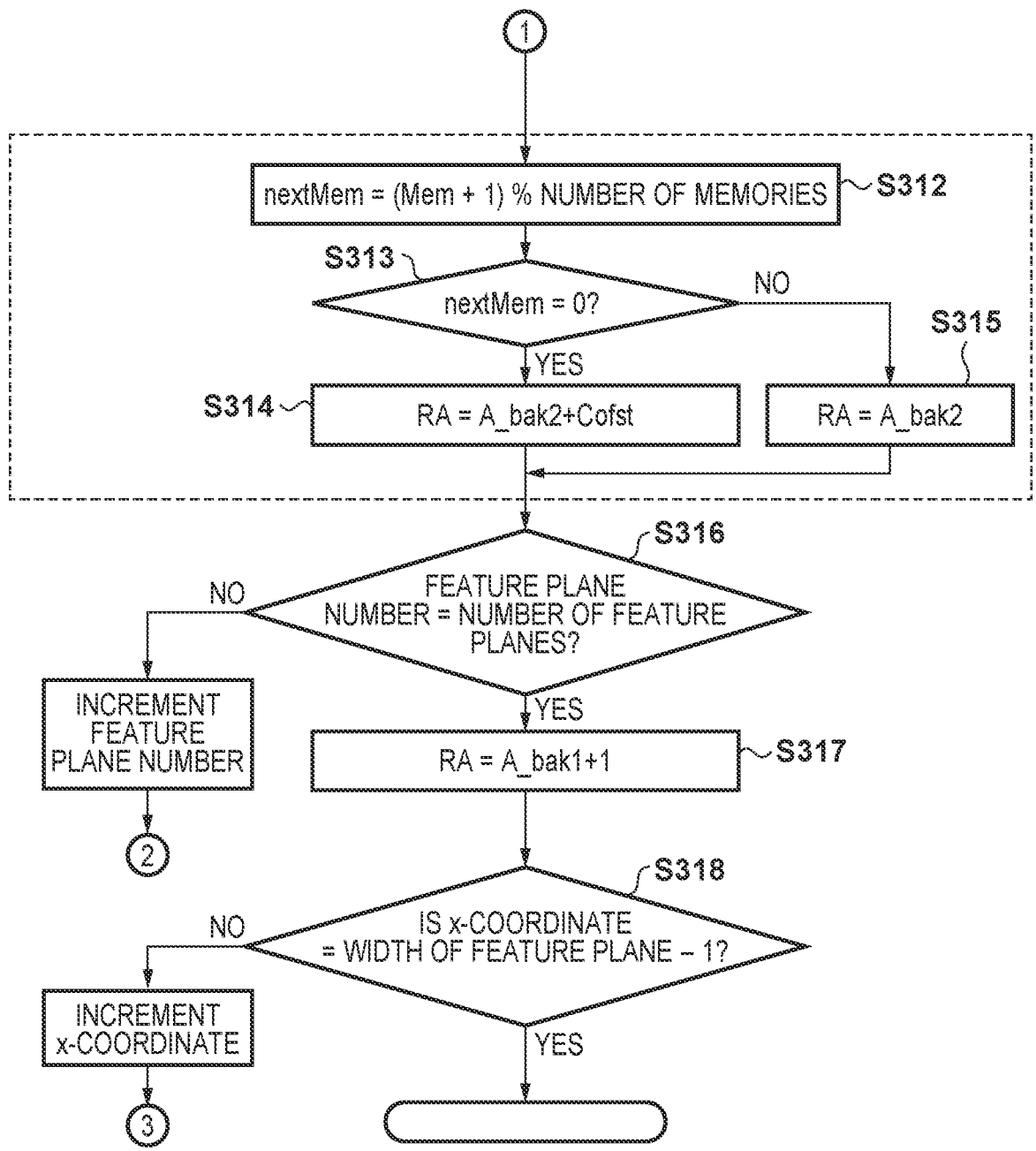

F I G. 13B
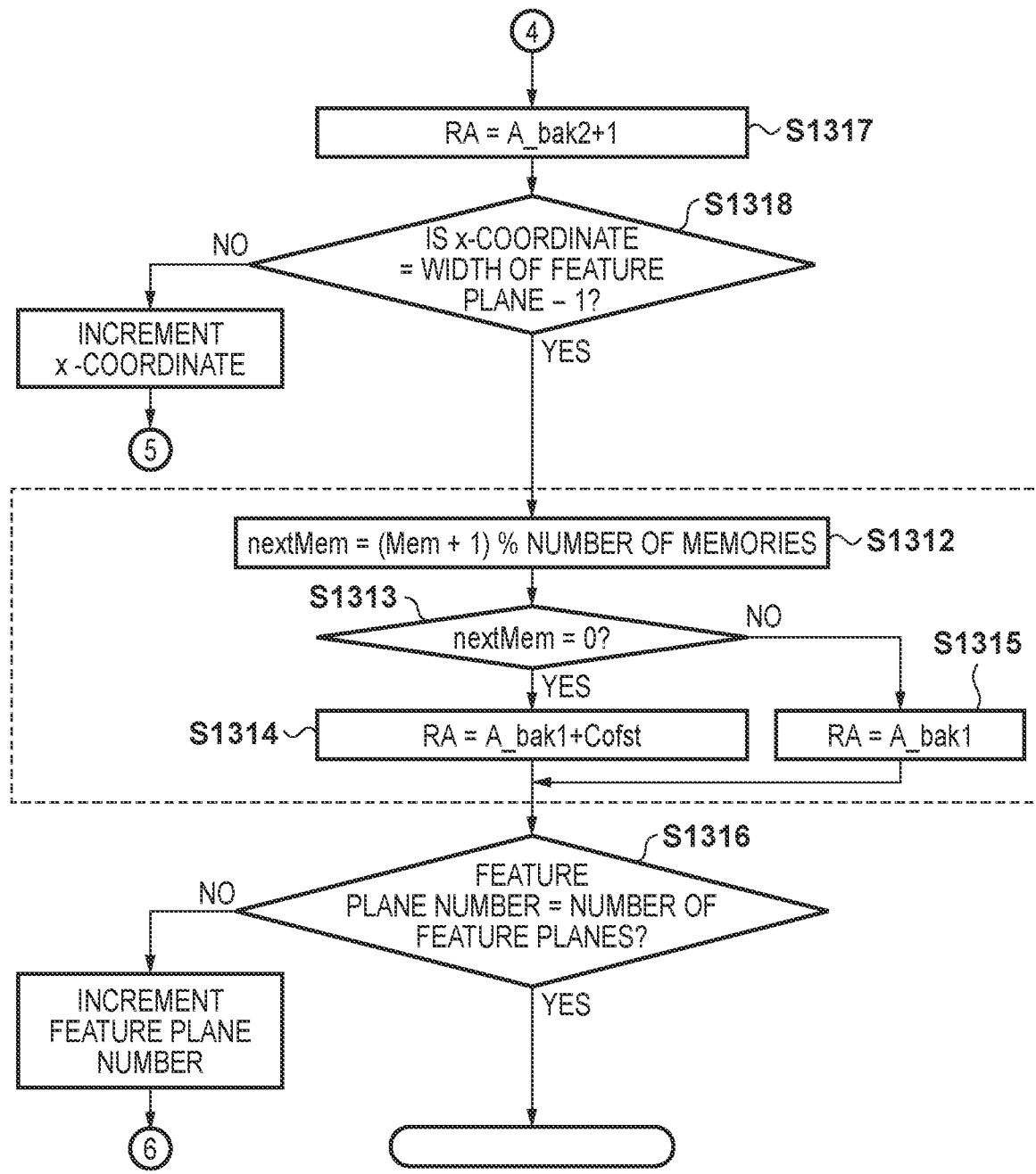

OPERATION PROCESSING APPARATUS THAT EXECUTES HIERARCHICAL CALCULATION, OPERATION PROCESSING METHOD, AND NON-TRANSITORY COMPUTER-READABLE STORAGE MEDIUM

BACKGROUND OF THE INVENTION

Field of the Invention

The present invention relates to a technique of performing hierarchical filter operation processing.

Description of the Related Art

A hierarchical operation method represented by a convolutional neural network (to be referred to as a CNN hereinafter) is receiving attention as a method of allowing pattern recognition robust to a variation of a recognition target. For example, various application examples and implementation examples are disclosed in Yann LeCun, Koray Kavukvuoglu and Clement Farabet: Convolutional Networks and Applications in Vision, Proc. International Symposium on Circuits and Systems (ISCAS'10), IEEE, 2010.

FIG. 7 is a view showing the network configuration of an example of a simple CNN. Reference numeral 701 denotes an input layer which corresponds to raster-scanned image data of a predetermined size when processing by the CNN is performed for the image data. Reference numerals 703a to 703d denote feature planes in a first layer 708; 705a to 705d, feature planes in a second layer 709; and 707, a feature plane in a third layer 710. The feature plane indicates a data plane corresponding to the processing result of a predetermined feature extraction operation (a convolution operation and nonlinear processing). The feature plane corresponds to a feature extraction result for recognizing a predetermined target in an upper layer, and is a processing result with respect to the raster-scanned image data, and thus the processing result is also represented by a plane. The feature planes 703a to 703d are generated by a convolution operation and nonlinear processing corresponding to the input layer 701. For example, the feature plane 703a is calculated by two-dimensional convolution operations schematically indicated by 7021a to 7021d and nonlinear transformation of operation results. For example, a convolution operation with a kernel (coefficient matrix) size of columnSize×rowSize is processed by a product-sum operation given by:

$$\text{output}(x, y) = \sum_{l=1}^{L} \sum_{row=0}^{rowSize-1} \sum_{column=0}^{LcolumnSize-1} \text{input}(x + column, y + row) \times \text{weight}(column, row) \quad (1)$$

input(x, y): reference pixel value at two-dimensional coordinates (x, y)
output(x, y): operation result at two-dimensional coordinates (x, y)
weight(column, row): weighting coefficient at coordinates (x+column, y+row)
L: the number of feature maps of preceding layer
columnSize, rowSize: convolution kernel size In the processing by the CNN, the product-sum operation is repeated while scanning a plurality of convolution kernels on a pixel basis, and nonlinear transformation is performed for a final product-sum result, thereby calculating a feature plane. Note that when calculating the feature plane 703a, the number of connections with the preceding layer is one, and thus the number of convolution kernels is one. The convolution kernels 7021a to 7021d are used to calculate the feature planes 703a to 703d, respectively.

FIG. 8 is a view for explaining an example when the feature plane 705a is calculated. The feature plane 705a is connected to the feature planes 703a to 703d in the first layer 708 (the preceding layer). When calculating data of the feature plane 705a, a convolution operation processing unit 801 performs, for the feature plane 703a, a filter operation using a kernel schematically indicated by 7041a, and the result of the filter operation is held in an accumulator 802. Similarly, the convolution operation processing unit 801 performs, for the feature planes 703b to 703d, convolution operations by kernels denoted by reference numerals 7042a, 7043a, and 7044a, respectively, and operation results are accumulated in the accumulator 802. After the end of the four kinds of convolution operations, the accumulator 802 performs accumulation of the four kinds of convolution operations. Then, a nonlinear transformation processing unit 803 performs, for the result of the accumulation, nonlinear transformation processing using a logistic function or a hyperbolic tangent function (tanh function). By performing the above processing for the entire image while scanning each pixel, the feature plane 705a is calculated. Similarly, the feature planes 705b to 705d are calculated by performing, for the feature planes in the first layer 708 (the preceding layer), convolution operations by kernels denoted by reference numerals 7041b to 7044b, convolution operations by kernels denoted by reference numerals 7041c to 7044c, convolution operations by kernels denoted by reference numerals 7041d to 7044d, respectively, and performing accumulation and nonlinear processing. Furthermore, the feature plane 707 is calculated using four convolution operations denoted by reference numerals 7061 to 7064 with respect to the feature planes 705a to 705d in the second layer 709 (the preceding layer).

Note that each kernel coefficient is decided in advance by learning using a general method such as perceptron learning or back-propagation learning. The convolution kernel often has a different size for each layer.

In a method described in Japanese Patent No. 5368687, an SRAM memory is included, and is used as an intermediate buffer that stores some or all of the feature planes 703a to 703d and 705a to 705d in the intermediated layers. Data read out from the intermediate buffer undergoes convolution operation processing, and an obtained processing result is stored in the intermediate buffer. At this time, a reference range necessary for convolution operation processing for each pixel is determined by the convolution kernel size of columnSize×rowSize. A convolution kernel size of columnSize=N×rowSize=M will be referred to as N×M hereinafter.

FIG. 9 is a view showing the feature planes 703a to 703d in the first layer 708, the feature planes 705a to 705d in the second layer 709, and regions stored in the intermediate buffer. The feature planes in both the layers have a width of 20, and n(x, y) represents data at coordinates (x, y) on a data plane of each of feature planes 703n and 705n (n=a to d). When the kernel size of each of the convolution operations for calculating the second layer 709 is 4×4, the feature planes 705a to 705d in the second layer 709 are calculated with reference to 4 pixels in the x direction and 4 pixels in the y direction of each of the feature planes 703a to 703d in the first layer 708, as indicated by equation (1) above. More specifically, when calculating data at coordinates (0, 0) of the feature planes 705a to 705d, pixels in regions 902 to 905 of the feature planes 703a to 703d in the first layer 708 are used as reference pixels. Therefore, it is necessary to store at least the regions 902 to 905 in the intermediate buffer. To efficiently calculate the feature planes in the second layer 709, it is preferable to store, in the intermediate buffer, four lines of (0, 0) to (19, 3) of each of the feature planes 703a to 703d in the first layer 708 and calculate one line of (0, 0) to (19, 0) of each of the feature planes 705a to 705d in the raster order.

Similarly, when the kernel size of each of the convolution operations for calculating the third layer 710 is 5×5, the feature plane 707 is calculated with reference to 5 pixels in the x direction and 5 pixels in the y direction. Therefore, five lines of (0, 0) to (19, 4) of each of the feature planes 705a to 705d are stored in the intermediate buffer to calculate one line of the feature plane 707.

Japanese Patent Laid-Open No. 61-62187 and the like disclose techniques of increasing the speed by storing, in different memories, a plurality of lines necessary for a general filter operation, and simultaneously reading them out.

FIG. 10 is a view showing a memory storage method for speeding up processing by forming the intermediate buffer by two SRAMs (memories 0 and 1), arranging the feature planes 703a to 703d of the first layer 708 in different memories on a line basis, and then simultaneously reading out two lines. Assume that the data width of each SRAM is 4 bytes and a data size for each coordinate point on the feature plane is 1 byte.

Data of an odd-numbered line of the feature plane 703a is stored in memory 0, and data of an even-numbered line of the feature plane 703a is stored in memory 1. An offset from the start address of a line to the start address of the next line in the memory is called a line offset, and the line offset for memories 0 and 1 is 0×14. Similarly, with respect to the feature planes 703b to 703d, data of an odd-numbered line is stored in memory 0 and data of an even-numbered line is stored in memory 1. An offset from the start address of a feature plane to the start address of the next feature plane is called a channel offset, and the channel offset of each of memories 0 and 1 is 0×28.

An operation for calculating data at coordinates (0, 0) on the feature plane 705a will now be described. First, to perform a convolution operation of data of the feature plane 703a, data at the start address 0×0 in memories 0 and 1 are simultaneously read out (that is, data of the first and second lines are simultaneously read out). Subsequently, data at an address 0×14 obtained by adding the line offset to the current readout address 0×0 in memories 0 and 1 are simultaneously read out (that is, data of the third and fourth lines are simultaneously read out). A convolution operation is performed for the read data obtained by the two readout operations, thereby obtaining a processing result.

Subsequently, with respect to data of the feature plane 703b, data at an address 0×28 obtained by adding the channel offset to the start address 0×0 in memories 0 and 1 are simultaneously read out (that is, data of the first and second lines are simultaneously read out). Then, data at an address 0×3c obtained by adding the line offset to the current readout address are simultaneously read out (that is, data of the third and fourth lines are simultaneously read out). A convolution operation is performed for the read data obtained by the two readout operations, thereby obtaining a processing result. Subsequently, with respect to the feature planes 703c and 703d as well, data are similarly read out, thereby obtaining processing results.

Then, data at the coordinates (0, 0) on the feature plane 705a is obtained by performing accumulation of the results of the convolution operations of the feature planes 703a to 703d and performing nonlinear processing for the result of the accumulation.

As described above, when the intermediate buffer is formed by two SRAMs, it is possible to simultaneously read out data of two lines. Therefore, the number of times of readout processing is ½ of that when the intermediate buffer is formed by one SRAM, and it is thus possible to perform processing at high speed. In addition, if the number of lines stored in the intermediate buffer is an odd number, readout addressing for memories 0 and 1 is the same, and thus an addressing circuit can be shared, thereby reducing the cost and readily executing control.

FIG. 11 is a view showing a method of storing five lines of each of the feature planes 705a to 705d of the second layer 709 in the intermediate buffer formed by memories 0 and 1 described above. Data are stored from an address 0×a0 adjacent to the storage area of the feature planes of the first layer 708.

Odd-numbered lines of the feature plane 705a are stored in memory 0, and even-numbered lines of the feature plane 705a are stored in memory 1. With respect to the feature plane 705b, if the odd-numbered lines are arranged in memory 0 and the even-numbered lines are arranged in memory 1, the use amounts of memories 0 and 1 are biased. Thus, to effectively use the memories, the odd-numbered lines are stored in memory 1 and the even-numbered lines are stored in memory 0. With respect to the feature plane 705c, odd-numbered lines are stored in memory 0 and even-numbered lines are stored in memory 1, similar to the feature plane 705a. With respect to the feature plane 705d, odd-numbered lines are stored in memory 1 and even-numbered lines are stored in memory 0, similar to the feature plane 705b. At this time, the line offset for memories 0 and 1 is 0×14. The channel offset is not a fixed value, and is switched between 0×28 and 0×3c depending on the feature plane.

An operation for calculating data at coordinates (0, 0) on the feature plane 707 will now be described. First, to perform a convolution operation of data of the feature plane 705a, data are simultaneously read out from the address 0×a0 in memories 0 and 1 (that is, data of the first and second lines are simultaneously read out). Subsequently, data are simultaneously read out from an address 0×b4 obtained by adding the line offset to the current readout address (that is, data of the third and fourth lines are simultaneously read out). Furthermore, data is read out from an address 0×c8 obtained by adding the line offset to the current readout address only in memory 0 (that is, data of the fifth line is read out), and a convolution operation is performed for the read data obtained by the three readout operations, thereby obtaining a processing result.

Subsequently, to read out data of the feature plane 705b, the channel offset is added. The channel offset of memory 0 is 0×3c and the channel offset of memory 1 is 0×28, and thus the addresses in memories 0 and 1 are different. As the data of the first and second lines, data at an address 0×c8 in memory 1 and data at an address 0×dc in memory 0 are simultaneously read out. As the data of the third and fourth lines, data at an address 0×c8 in memory 1 and data at an address 0×f0 in memory 0 are simultaneously read out. Furthermore, as the data of the fifth line, data at an address 0×f0 in memory 1 is read out, and a convolution operation is performed for the read data obtained by the three readout operations, thereby obtaining a processing result.

Subsequently, to read out data of the feature plane 705*c*, the channel offset is added. At this time, the channel offset of memory 0 is 0×28 and the channel offset of memory 1 is 0×3c, and thus these offsets are different from those when reading out the data of the feature plane 705*b*.

Similarly, data of the feature planes 705*c* and 705*d* are read out, and results of convolution operations are accumulated, thereby obtaining data at the coordinates (0, 0) of the feature plane in the next layer.

As described above, if the number of lines of the feature plane stored in the intermediate buffer is an odd number, readout addresses in memories 0 and 1 are different. Thus, addressing circuits are separately required, and addressing is performed while switching the channel offset, thus complicating control.

In the arrangement shown in FIG. 10, as another method of storing five lines in the intermediate buffer, readout addressing of memories 0 and 1 can be the same by storing six lines. However, one line is useless.

As described above, in the processing by the CNN, if the convolution kernel size varies for each layer and the intermediate buffer is formed by a plurality of memories, addressing of the memories is complicated and the memory use efficiency decreases depending on the kernel size.

SUMMARY OF THE INVENTION

The present invention provides a technique for making it possible to read out data from a memory at high speed and improve the memory use efficiency.

According to the first aspect of the present invention, there is provided an operation processing apparatus for calculating a plurality of feature planes by hierarchically performing filter operation processing for input image data, comprising: an operation unit configured to perform a convolution operation; a data holding unit including a plurality of memories configured to store image data and an operation result of the operation unit; a memory write control unit configured to receive the operation result output from the operation unit, and then write, out of the received operation result, data of successive lines of the same feature plane in different memories of the plurality of memories and write data at the same coordinates of a plurality of feature planes in the same layer in different memories of the plurality of memories; and a memory readout control unit configured to read out the data of the successive lines of the same feature plane from the different memories of the data holding unit, read out the data at the same coordinates of the different feature planes in the same layer from the different memories of the data holding unit, and then transmit the data to the operation unit.

According to the second aspect of the present invention, there is provided an operation processing method for an operation processing apparatus that calculates a plurality of feature planes by hierarchically performing filter operation processing for input image data, the method comprising: causing an operation unit of the operation processing apparatus to perform a convolution operation; causing a memory write control unit of the operation processing apparatus to receive an operation result output from the operation unit, and then write, out of the received operation result, data of successive lines of the same feature plane in different memories of a plurality of memories that store image data and the operation result of the operation unit and write data at the same coordinates of a plurality of feature planes in the same layer in different memories of the plurality of memories; and causing a memory readout control unit of the operation processing apparatus to read out the data of the successive lines of the same feature plane from the different memories of the plurality of memories, read out the data at the same coordinates of the different feature planes in the same layer from the different memories of the plurality of memories, and then transmit the data to the operation unit.

According to the third aspect of the present invention, there is provided a non-transitory computer-readable storage medium storing a computer program for causing, a computer of an operation processing apparatus that calculates a plurality of feature planes by hierarchically performing filter operation processing for input image data, to execute an operation processing method, the method comprising: causing an operation unit of the operation processing apparatus to perform a convolution operation; causing a memory write control unit of the operation processing apparatus to receive an operation result output from the operation unit, and then write, out of the received operation result, data of successive lines of the same feature plane in different memories of a plurality of memories that store image data and the operation result of the operation unit and write data at the same coordinates of a plurality of feature planes in the same layer in different memories of the plurality of memories; and causing a memory readout control unit of the operation processing apparatus to read out the data of the successive lines of the same feature plane from the different memories of the plurality of memories, read out the data at the same coordinates of the different feature planes in the same layer from the different memories of the plurality of memories, and then transmit the data to the operation unit.

Further features of the present invention will become apparent from the following description of exemplary embodiments (with reference to the attached drawings).

BRIEF DESCRIPTION OF THE DRAWINGS

FIGS. 3A and 3B are flowcharts each of the operation of a memory readout control unit 104;

FIGS. 5A-1 and 5A-2 are views showing data storage states in memories 0 and 1;

FIGS. 13A and 13B are flowcharts each of the operation of a memory readout control unit 104 when performing operation processing in the raster order first.

DESCRIPTION OF THE EMBODIMENTS

Figure 1:
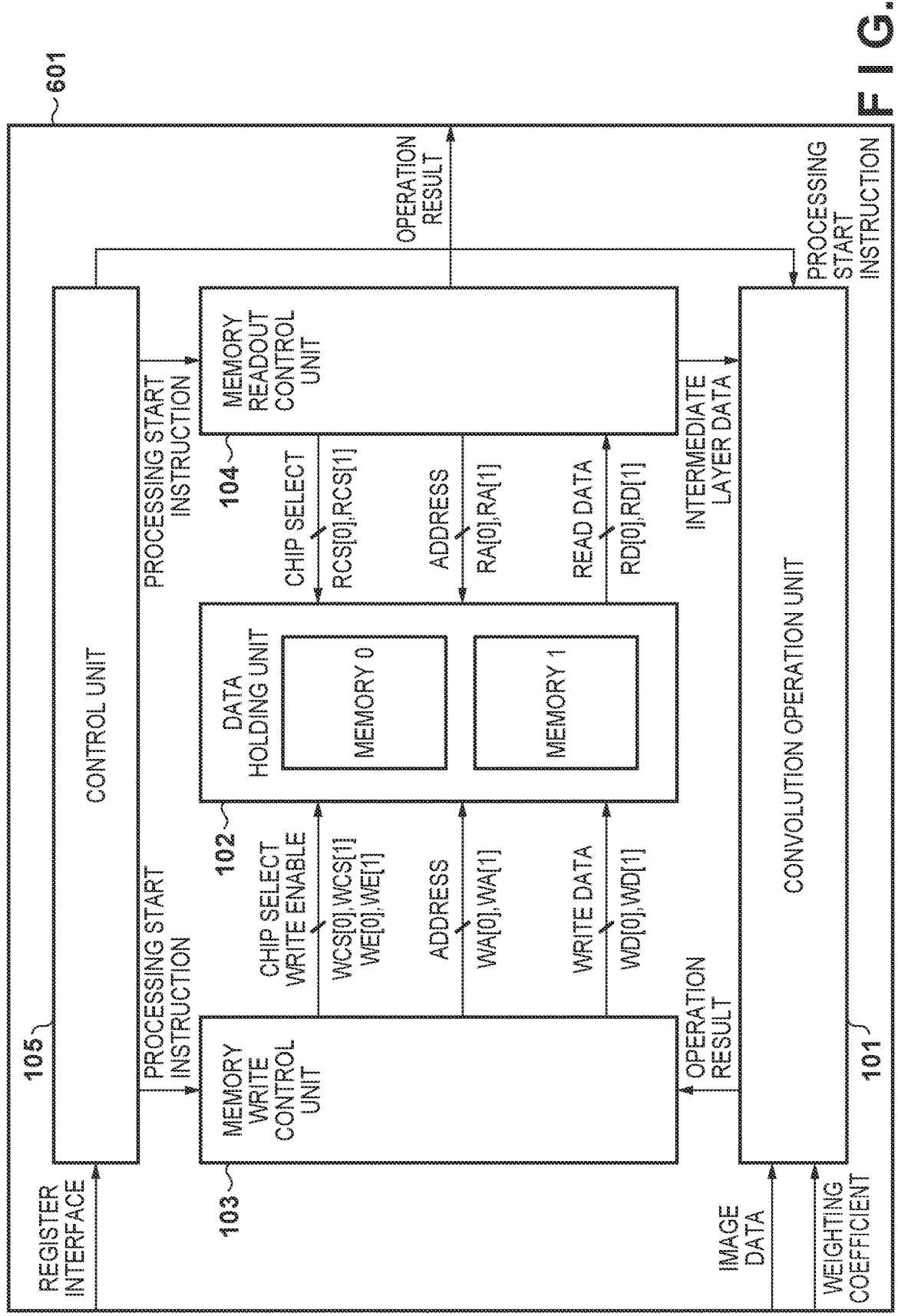
FIG. 1 is block diagram showing an example of the hardware arrangement of a CNN processing unit 601.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 6:
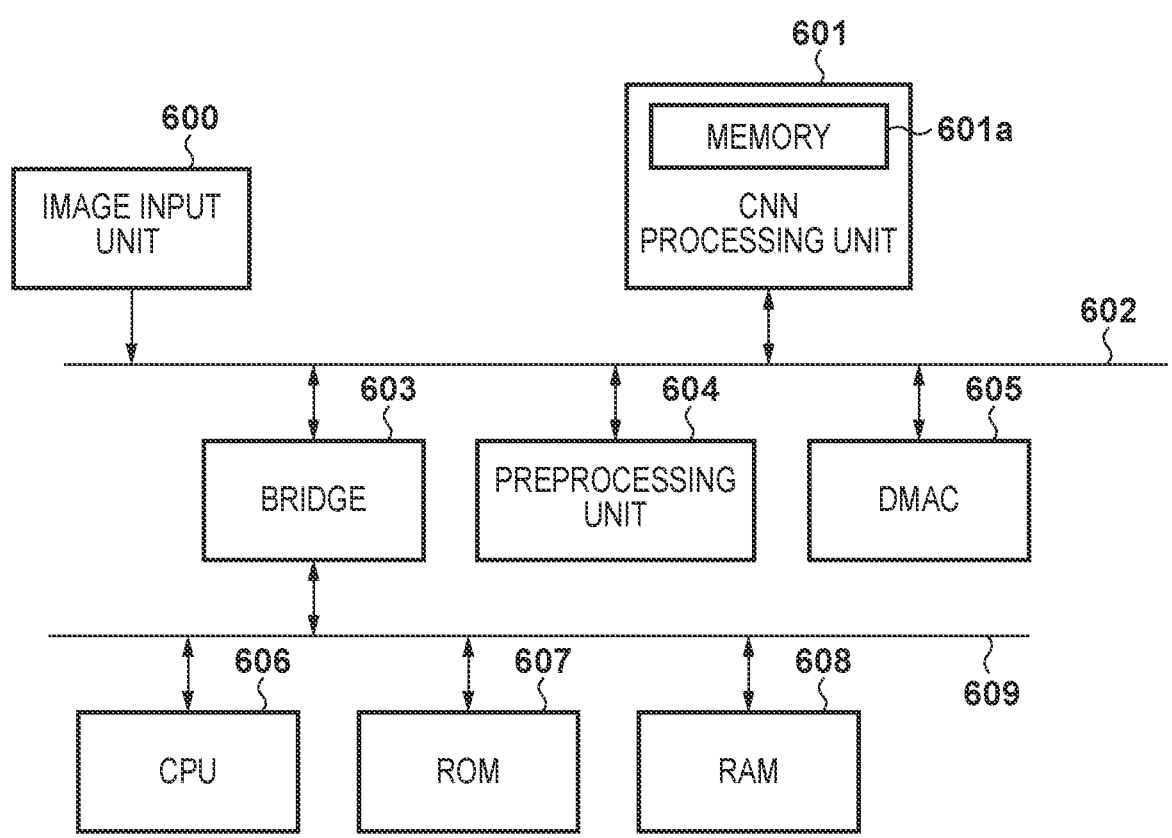
FIG. 6 is a block diagram showing an example of the hardware arrangement of an image processing system.

An example of the hardware arrangement of an image processing system using a pattern recognition apparatus as an operation processing apparatus according to this embodiment will be described with reference to a block diagram shown in FIG. 6. The image processing system according to this embodiment has a function of detecting a region of a specific object from an input image.

An image input unit 600 acquires image data as an input image by performing image capturing. The image data may be data of an image of each frame in a moving image or data of a still image. The image input unit 600 is formed by a driver circuit for controlling an optical system, a photoelectric conversion device such as a CCD (Charge-Coupled Devices) or CMOS (Complementary Metal Oxide Semiconductor) sensor, and a sensor, an AD converter, a signal processing circuit for controlling various kinds of image correction, a frame buffer, and the like.

A CNN processing unit 601 includes the pattern recognition apparatus as the operation processing apparatus according to this embodiment, and detects a region of a specific object from the image data obtained by the image input unit 600. The CNN processing unit 601 includes a memory 601a, the memory 601a includes two memories (memories 0 and 1 to be described later) used as an intermediate buffer, and the two memories make it possible to simultaneously access two lines.

A DMAC (Direct Memory Access Controller) 605 controls data transfer between each processing unit on an image bus 602 and each processing unit on a CPU bus 609.

A bridge 603 provides the bridge function between the image bus 602 and the CPU bus 609.

A preprocessing unit 604 performs various kinds of preprocessing for effectively executing pattern recognition processing by the CNN processing unit 601. More specifically, with respect to the image data acquired by the image input unit 600, the preprocessing unit 604 processes image transformation processing such as color transformation processing and contrast correction processing by hardware.

A CPU 606 executes various kinds of processing using computer programs and data stored in a ROM 607 and a RAM 608. Thus, the CPU 606 controls the operation of the overall image processing system, and also executes or controls each processing to be described later as that executed by the image processing system.

The ROM (Read Only Memory) 607 stores data and a computer program including a command that defines the operation of the CPU 606. In the following description, information processed as information known by the image processing system is stored in the ROM 607.

The RAM 608 has an area to store the computer program and data loaded from the ROM 607, an area to hold the image data acquired by the image input unit 600, an area to temporarily hold data to be processed, and the like. The RAM 608 also has a work area used by the CPU 606 to execute various kinds of processing. As described above, the RAM 608 can appropriately provide various kinds of areas.

Note that the RAM 608 or the ROM 607 stores parameters such as a weighting coefficient used for a convolution operation performed by the CNN processing unit 601.

The image data acquired by the image input unit 600 is input to the CNN processing unit 601 via the preprocessing unit 604. The CNN processing unit 601 performs predetermined determination processing for each pixel of the input image data having undergone the preprocessing, thereby detecting the region of the specific object in the image represented by the image data. Information (information for defining the region in the image, an image in the region, or the like) concerning the region detected by the CNN processing unit 601 is transferred to the RAM 608 by the DMAC 605, and stored in the RAM 608.

An example of the hardware arrangement of the CNN processing unit 601 will be described with reference to a block diagram shown in FIG. 1. The CNN processing unit 601 calculates feature planes in intermediate layers described with reference to FIG. 7 by hierarchically performing filter operation processing. The feature planes are calculated on a coordinate point basis in the feature plane order, and further calculated in the x direction. For example, after data at coordinates (x, y) are obtained in order of 703a (705a), 703b (705b), 703c (705c), and 703d (705d) (in order of a to d), data at coordinates (×+1, y) are obtained next in order of a to d, and then data at coordinates (×+2, y) are obtained in order of a to d.

A control unit 105 controls the overall CNN processing unit 601. The control unit 105 includes an operation setting register (not shown), and register values held in the operation setting register are set by the CPU 606 via a register interface. The register values held in the operation setting register are sent to a convolution operation unit 101, a memory write control unit 103, and a memory readout control unit 104 (all of which will be described later) via signal lines (not shown).

The operation setting register holds, as the register values, feature plane information (the width of each feature plane, the number of lines, the number of feature planes, the start address in the intermediate buffer in which the feature plane is arranged, the number of lines) for each layer, and information (convolution kernel size) of connection between layers. The operation setting register includes an enable register.

If the CPU 606 sets the pieces of feature plane information of all the layers and the information of connection between the layers, and turns on the enable register, the control unit 105 decides the feature plane calculation order of all the layers on a line basis. That is, the calculation target layer is switched and processed for each line. In the calculation target layer, calculation is performed for each coordinate point in the feature plane direction, and the coordinate point is shifted in the raster direction to process one line of each of all the feature planes.

The control unit 105 sends, to the convolution operation unit 101, the memory write control unit 103, and the memory readout control unit 104, the number (layer number) of the calculation target layer and the number (line number: y-coordinate) of the calculation target line based on the decided order, and then issues a processing start instruction.

The convolution operation unit 101 includes an interface for inputting the externally transferred image data and an interface for inputting the weighting coefficient used for a convolution operation. Furthermore, the convolution operation unit 101 includes an interface for inputting intermediate layer data transmitted from the memory readout control unit 104 (to be described later) and an interface for outputting an operation result to the memory write control unit 103. Then, the convolution operation unit 101 selects one input data from the image data and the intermediate layer data (in accordance with the number of the calculation target layer transferred from the control unit 105 at the time of issuing the processing start instruction), and performs an operation. In addition, the convolution operation unit 101 includes a memory that stores a plurality of weighting coefficients, and selects a weighting coefficient in accordance with the number of the calculation target layer and uses it.

If the calculation target is a feature plane in a first layer 708, the convolution operation unit 101 uses the image data as input data, and uses the weighting coefficient used to calculate the feature planes 703a to 703d. If the calculation target is a feature plane in a second layer 709, the convolution operation unit 101 uses the intermediate layer data as input data, and selects the weighting coefficient used to calculate the feature planes 705a to 705d. If the calculation target is a feature plane 707 in a third layer 710, the convolution operation unit 101 uses the intermediate layer data as input data, and selects the weighting coefficient used to calculate the feature plane 707. An operation result is output on a pixel basis.

A data holding unit 102 serves as a memory (intermediate buffer) for buffering data of the intermediate layer, and is formed by two SRAMs each having two ports of read and write ports and a data width of 4 bytes. The interface of the write port of the SRAM is formed by chip select (WCS), write enable (WE), write address (WA), and write data (WD) signals. The interface of the read port is formed by chip select (RCS), read address (RA), and read data (RD) signals. One of the two SRAMs will be referred to as memory 0 hereinafter and the other SRAM will be referred to as memory 1 hereinafter. Data of the feature plane in the intermediate layer (the first layer 708, the second layer 709, or the third layer 710) is arranged by designating the start address in the intermediate buffer and the number of lines for each layer. Each region of the intermediate buffer is used as a ring buffer.

The memory write control unit 103 receives the operation result of the convolution operation unit 101 on a pixel basis, and writes it in the data holding unit 102. The memory write control unit 103 controls the chip select signals WCS[0] and WCS[1], write enable signals WE[0] and WE[1], write address signals WA[0] and WA[1], and write data signals WD[0] and WD[1] of the write ports of memories 0 and 1. [Number] following each signal name indicates the number (memory number) of the memory. The memory number of memory 0 is [0], and the memory number of memory 1 is [1]. Control of the interface signals of the memories is executed based on the number of the calculation target layer and the number (y-coordinate) of the calculation target line given from the control unit 105.

The operation of the memory write control unit 103 will be described with reference to a flowchart shown in FIG. 2. Upon receiving the number of the calculation target layer, the number (y-coordinate) of the calculation target line, and the processing start instruction from the control unit 105, the memory write control unit 103 starts processing. From the received layer number, feature plane information (the width of each feature plane, the number of feature planes, the start address in the intermediate buffer in which the feature plane is arranged, and the number of lines) of the layer to be written in the memory is specified.

In step S201, the number (line number: k) of the line in the intermediate buffer as a write target, a channel offset (Cofst), and a write address (WA) are calculated. Since the intermediate buffer is used as a ring buffer, k as the line number in the intermediate buffer is decided by a remainder operation (a remainder operator will be represented by mod hereinafter) of the y-coordinate by the number of lines in the intermediate buffer based on the y-coordinate as the number of calculation target line and the number of lines in the intermediate buffer. Cofst is calculated by (width of feature plane×the number of lines in intermediate buffer). WA is calculated by the start address (SA) in the intermediate buffer in which the feature plane is arranged, the width of the feature plane, and k. The x-coordinate of the calculation target is initialized to 0.

In step S202, the number (feature plane number) of the feature plane is initialized to 1, and a write address when the feature plane number=1 is saved. This write address is an address referred to when the x-coordinate advances.

In step S203, the process stands by for data reception of an operation result. After receiving the data of the operation result, the process advances to step S204.

In step S204, a memory number Mem as the number of the memory in which the received data (the data of the operation result) is written. The memory number Mem is calculated by {(k+feature plane number−1) mod the number of memories} using the feature plane number, the line number k in the intermediate buffer, and the number of memories. In this embodiment, when the number of memories is two, y-coordinate=0, and the feature plane number=1, Mem=0 is obtained. Thus, memory 0 is selected, and then the memory is switched like memories 1, 0, 1, 0, every time the feature plane number increases. Furthermore, every time the line number k in the intermediate buffer increases, the memory is switched even for the same feature plane.

In this decision method, when the feature plane number is fixed and k is incremented, the memory number toggles. That is, successive lines of the same feature plane are written in the different memories. When k is fixed and the feature plane number is incremented, the memory number toggles. That is, the lines with the same line number of successive feature planes are written in the different memories.

In step S205, the received data is written. When the memory number is 0, the chip select signal (WCS[0]) of memory 0 is activated, WA is set in the write address signal (WA[0]), the received data is set in the write data signal (WD[0]), and then the data is written in memory 0. The write enable signal (WE[0]) activates an appropriate bit in accordance with the data width of the memory and the value of WA. When the memory number is 1, the received data is written in memory 1.

In step S206, the memory number (nextMem) of the memory in which data of the next feature plane is written is calculated. The next feature plane number is obtained by incrementing the current feature plane number by one, and nextMem is also obtained by incrementing the current memory number by one.

In step S207, it is determined whether the memory number nextMem of the memory in which the data of the next feature plane is written is 0 or 1. If, as a result of the determination processing, the memory number nextMem of the memory in which the data of the next feature plane is written is 0, the process advances to step S208; otherwise, the process advances to step S209.

In step S208, the write address is updated to a value obtained by adding the channel offset to the current write address. On the other hand, in step S209, the write address is not updated. That is, data at the same coordinates of the feature planes with the feature plane numbers N and N+1 (N is an odd number) are stored at the same write address in the memories of the different memory numbers.

In step S210, it is determined whether the feature plane number has reached the number of feature planes. If, as a result of the determination processing, the feature plane number has reached the number of feature planes, the process advances to step S211; otherwise, the feature plane number is incremented and the processes in steps S203 to S209 are executed until the feature plane number reaches the number of feature planes.

In step S211, the write address is updated to an address obtained by incrementing, by one, the write address when the feature plane number is 1, which is saved in step S202. The x-coordinate is incremented until it reaches the width of the feature plane, and data are sequentially stored from data of the feature plane number=1.

In step S212, it is determined whether the x-coordinate has reached the width of the feature plane. If, as a result of the determination processing, the x-coordinate has reached the width, the processing according to the flowchart shown in FIG. 2 ends; otherwise, the x-coordinate is incremented and steps S203 to S211 are executed until the x-coordinate reaches the width.

Figure 2:
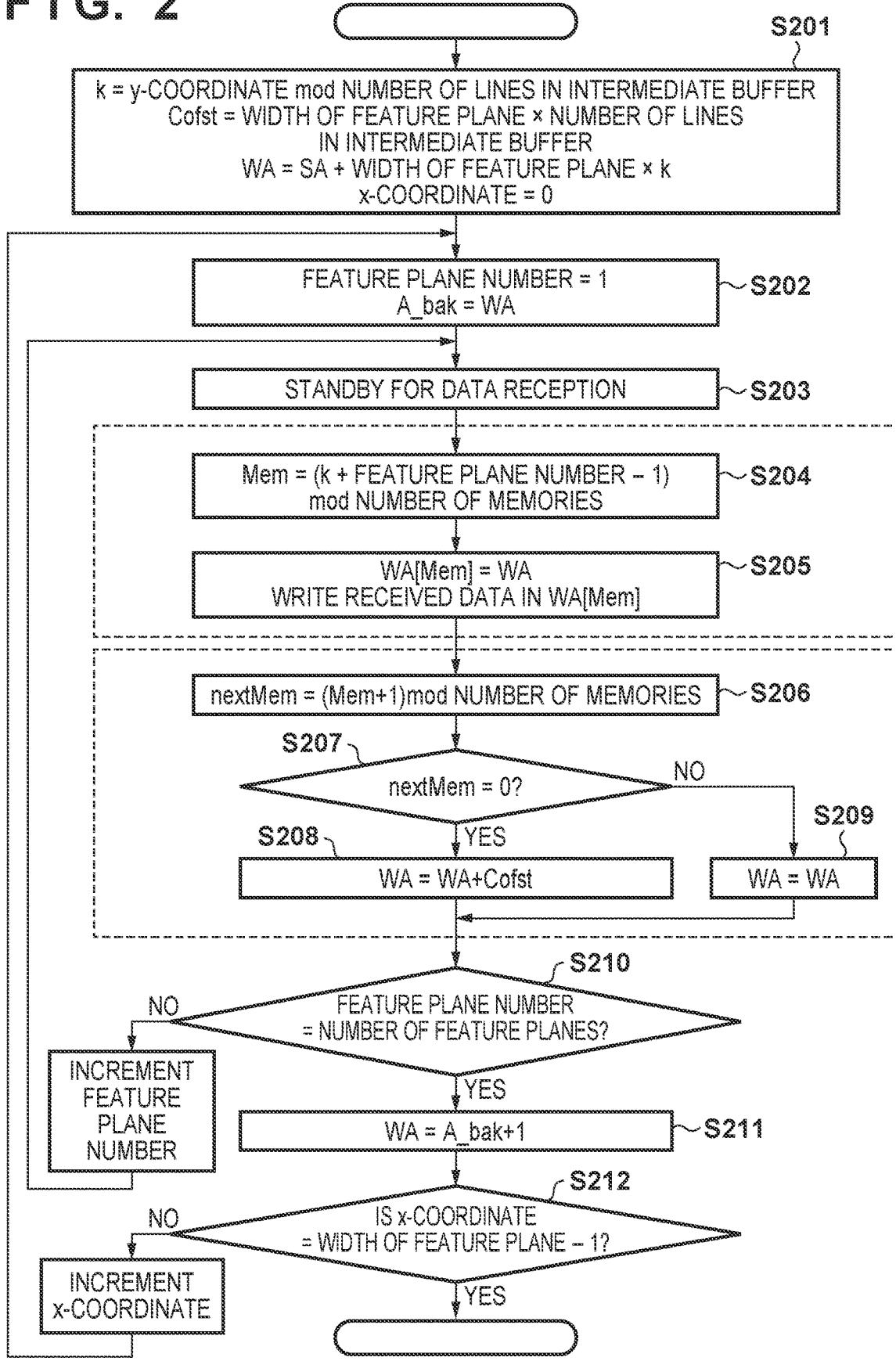
FIG. 2 is a flowchart of the operation of a memory write control unit 103.

In the processing according to the flowchart shown in FIG. 2, as indicated by steps S204 and S205, the successive lines of the same feature plane are stored in the different memories and it is thus possible to simultaneously read out the two lines. Furthermore, as indicated by steps S206 to S209, the data at the same coordinates of the feature planes with the feature plane numbers N and N+1 (N is an odd number) are stored at the same write address in the corresponding memories of the different memory numbers. Therefore, when the number of feature planes is a multiple of 2, data of equal data amounts are stored in the two memories regardless of the number of lines in the intermediate buffer. More specifically, in the address update method in steps S206 to S209, the feature planes with the feature plane numbers N and N+1 are grouped, and data at the same coordinates of the feature planes in the same group are stored at the same address in the different memories.

Referring back to FIG. 1, the memory readout control unit 104 reads out the data from the data holding unit 102, and transmits, to the convolution operation unit 101, the readout data as intermediate layer data serving as reference pixel data. The memory readout control unit 104 controls chip select signals RCS[0] and RCS[1] and address signals RA[0] and RA[1] of the read ports of the two memories (memories 0 and 1) of the data holding unit 102. The number following each signal name indicates the memory number. Control of the interface signals of the memories is executed based on the number of the calculation target layer and the number (y-coordinate) of the calculation target line given from the control unit 105. The reference pixel data is divisionally transmitted to the convolution operation unit 101 for every two lines at most in a plurality of times.

The operation of the memory readout control unit 104 will be described with reference to flowcharts shown in FIGS. 3A and 3B. Upon receiving the number of the calculation target layer, the number (y-coordinate) of the calculation target line, and the processing start instruction from the control unit 105, the memory readout control unit 104 starts processing.

From the number of the calculation target layer, feature plane information (the width of each feature plane, the number of lines, the number of feature planes, the start address in the intermediate buffer in which the feature plane is arranged, the number of lines) of the preceding layer to be referred to and information (convolution kernel size) of connection between the layers are specified.

In step S301, the number (k) of the start line in the intermediate buffer as a readout target, the channel offset (Cofst), and the read address (RA) are calculated. Since the intermediate buffer is used as a ring buffer, the number k of the start line in the intermediate buffer is decided by (y-coordinate mod the number of lines in intermediate buffer) based on the number (y-coordinate) of the calculation target line and the number of lines in the intermediate buffer. Cofst is calculated by (width of feature plane×the number of lines in intermediate layer). RA is calculated by the start address (SA) in the intermediate buffer in which the feature plane is arranged, the width of the feature plane, and k. The x-coordinate of the calculation target is initialized to 0.

In step S302, the feature plane number is initialized to 1, and a read address when the feature plane number=1 is saved. This read address is an address referred to when the x-coordinate advances.

In step S303, a reference pixel line number row is initialized to 0, and a read address when row=0 is saved.

In step S304, the memory number Mem of the start line of a reference pixel region to be read out is decided. The memory number Mem is decided by the same decision method as in step S204 described above.

In step S305, to decide the number (num_loop) of lines to be transmitted, it is determined whether (current reference pixel line number row+the number of memories) is equal to or smaller than rowSize. If, as a result of the determination processing, (current reference pixel line number row+the number of memories) is equal to or smaller than rowSize, the process advances to step S306; otherwise, the process advances to step S307.

In step S306, the number of lines to be transmitted is equal to the number of memories (num_loop=the number of memories). On the other hand, in step S307, the number of lines to be transmitted is equal to rowSize−row (num_loop=rowSize−row).

In step S308, the data is read out from the memory. If the memory number decided in step S304 is 0, the read address RA[0] of memory 0=RA is obtained. Then, columnSize-byte data is read out from RA, and the readout data (read data) is set as line data of row. Furthermore, columnSize-byte data is read out from the read address RA[1] of memory 1=RA+ width of feature plane×k, and the readout data (read data) is set as line data of row+1. On the other hand, if the memory number decided in step S304 is 1, the read address RA[1] of memory 1=RA is obtained, columnSize-byte data is read out from RA, and the readout data (read data) is set as line data of row. Furthermore, columnSize-byte data is read out from the read address RA[0] of memory 0=RA+width of feature plane×k, and the readout data (read data) is set as line data of row+1. A readout operation from memory 0 and a readout operation from memory 1 may simultaneously be performed. The processing in step S308 is performed the number of times which is equal to the number of lines to be transmitted.

In step S309, data of num_loop lines are transmitted. Next, in step S310, RA is updated to (RA+width of feature plane×the number of memories) for transmitting the next line.

In step S311, it is determined based on the reference pixel line number row whether all the reference pixel lines have been transmitted. If, as a result of the determination processing, all the reference pixel lines have been transmitted, the process advances to step S312. On the other hand, if a reference pixel line which has not been transmitted remains, the reference pixel line number row is incremented and the processes in steps S305 to S310 are executed until transmission of all the reference pixel lines is completed. Since the data of the lines for the number of memories are transmitted at once, the line reference pixel line number row is incremented by the number of memories.

After completion of transmission of all the reference pixel lines, the reference pixel region of the next feature plane is transmitted. In step S312, a start memory number nextMem of the reference pixel region of the next feature plane is decided. The start memory number nextMem of the reference pixel region of the next feature plane is obtained by calculating {(Mem+1) mod the number of memories}.

In step S313, it is determined whether nextMem=0. If, as a result of the determination processing, nextMem=0, the process advances to step S314; otherwise, the process advances to step S315.

In step S314, RA is updated to a value obtained by adding the channel offset to a read address A_bak2 backed up in step S303. On the other hand, in step S315, RA is returned to the read address A_bak2 backed up in step S303.

In the address update method in steps S312 to S315, for the feature plane numbers N and N+1 (N is an odd number), the same addressing is repeated to the read address RA, and the processing in step S308 makes access to the address in the memories of the different memory numbers. That is, the feature planes with the feature plane numbers N and N+1 are grouped, and data at the same coordinates of the feature planes in the same group are read out from the same address in the different memories.

In step S316, it is determined whether the feature plane number has reached the number of feature planes. If, as a result of the determination processing, the feature plane number has reached the number of feature planes, the process advances to step S137; otherwise, the feature plane number is incremented and steps S303 to S315 are executed until the feature plane number reaches the number of feature planes.

In step S317, RA is updated to an address obtained by adding 1 to a read address A_bak1 backed up in step S302.

In step S318, it is determined whether the x-coordinate has reached the width of the feature plane. If, as a result of the determination processing, the x-coordinate has reached the width, the processing according to the flowcharts shown in FIGS. 3A and 3B ends; otherwise, the x-coordinate is incremented and the processes in steps S302 to S317 are executed until the x-coordinate reaches the width.

Figure 3A:
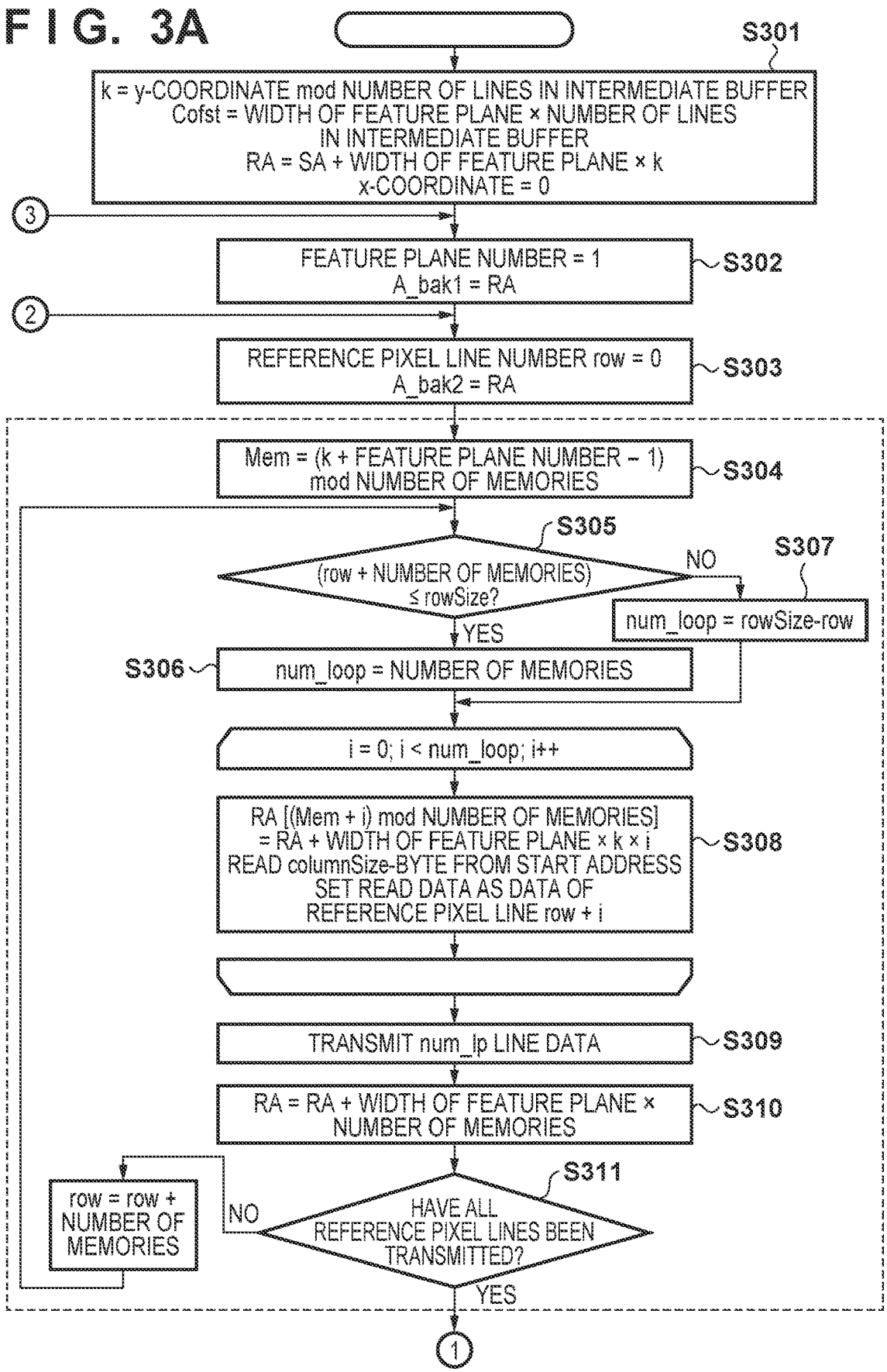

In the processing according to the flowcharts shown in FIGS. 3A and 3B, as indicated by step S308, two successive lines of the same feature plane are simultaneously read out from the different memories. Addressing manages only one read address (RA), and RA[0] and RA[1] are decided by RA or (RA+width of feature plane×k) in step S308 in accordance with the memory number calculated in step S304. Thus, one addressing circuit is required.

Figure 7:
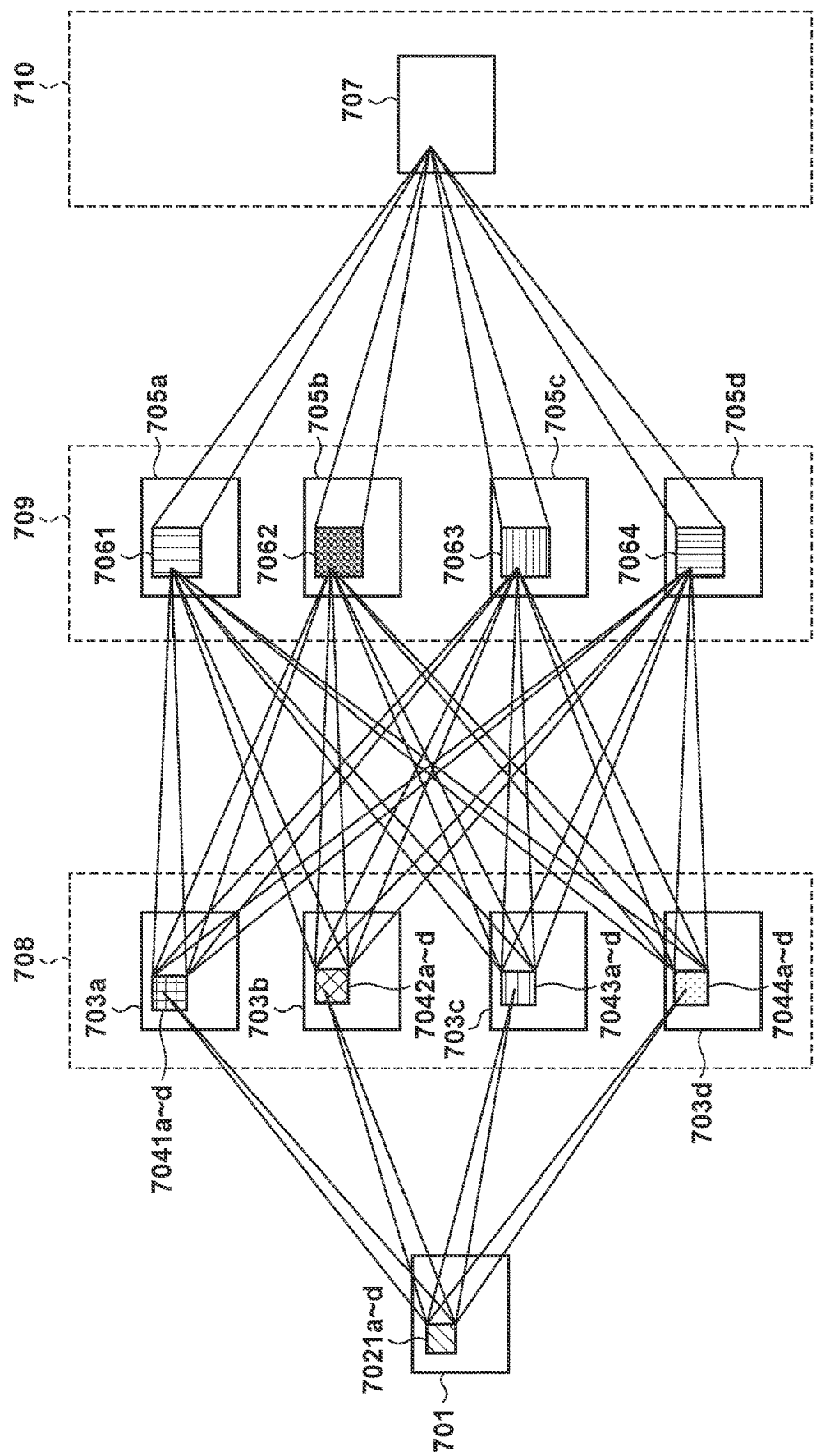
FIG. 7 is a view showing the network configuration of an example of a simple CNN.
Figure 8:
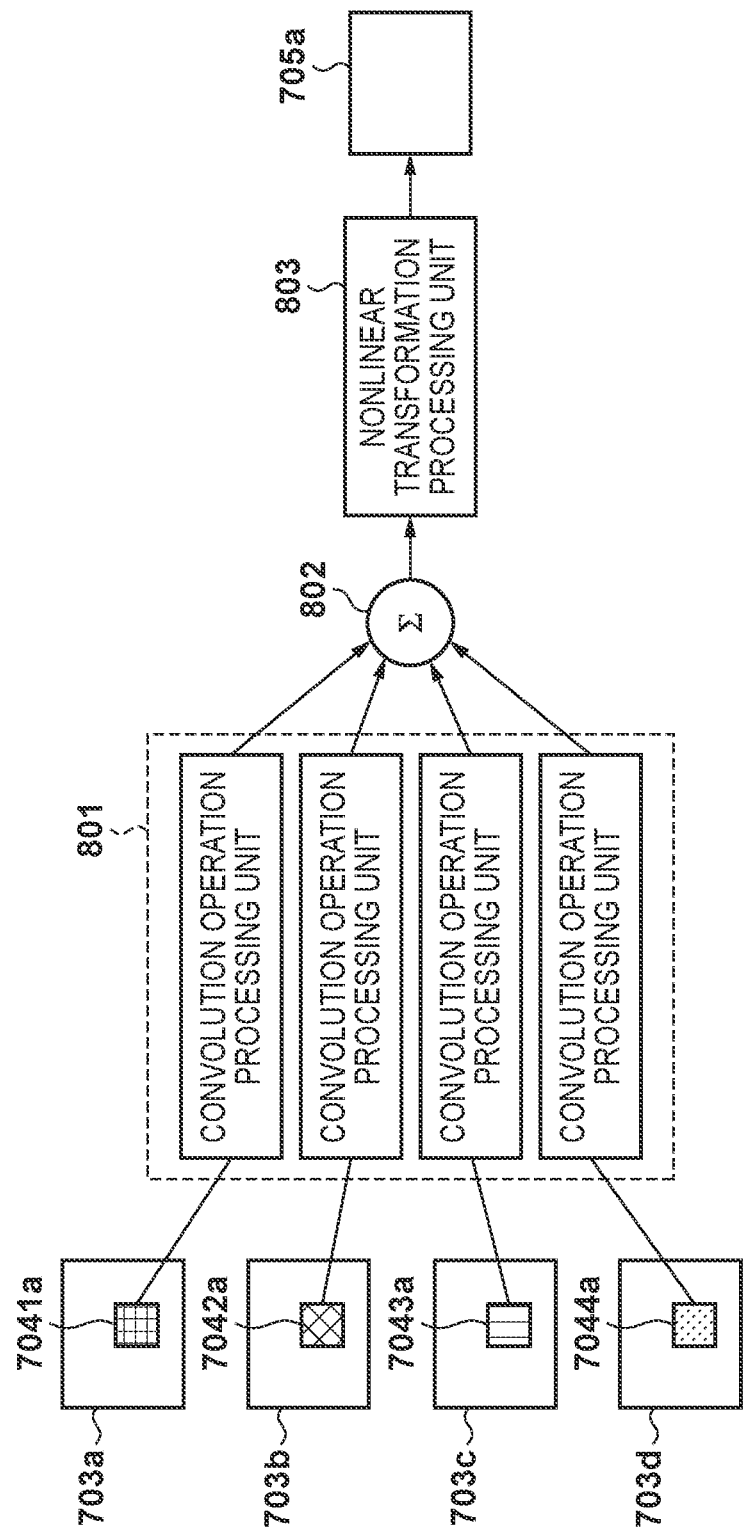
FIG. 8 is a view for explaining an example when calculating a feature plane 705*a*.
Figure 9:
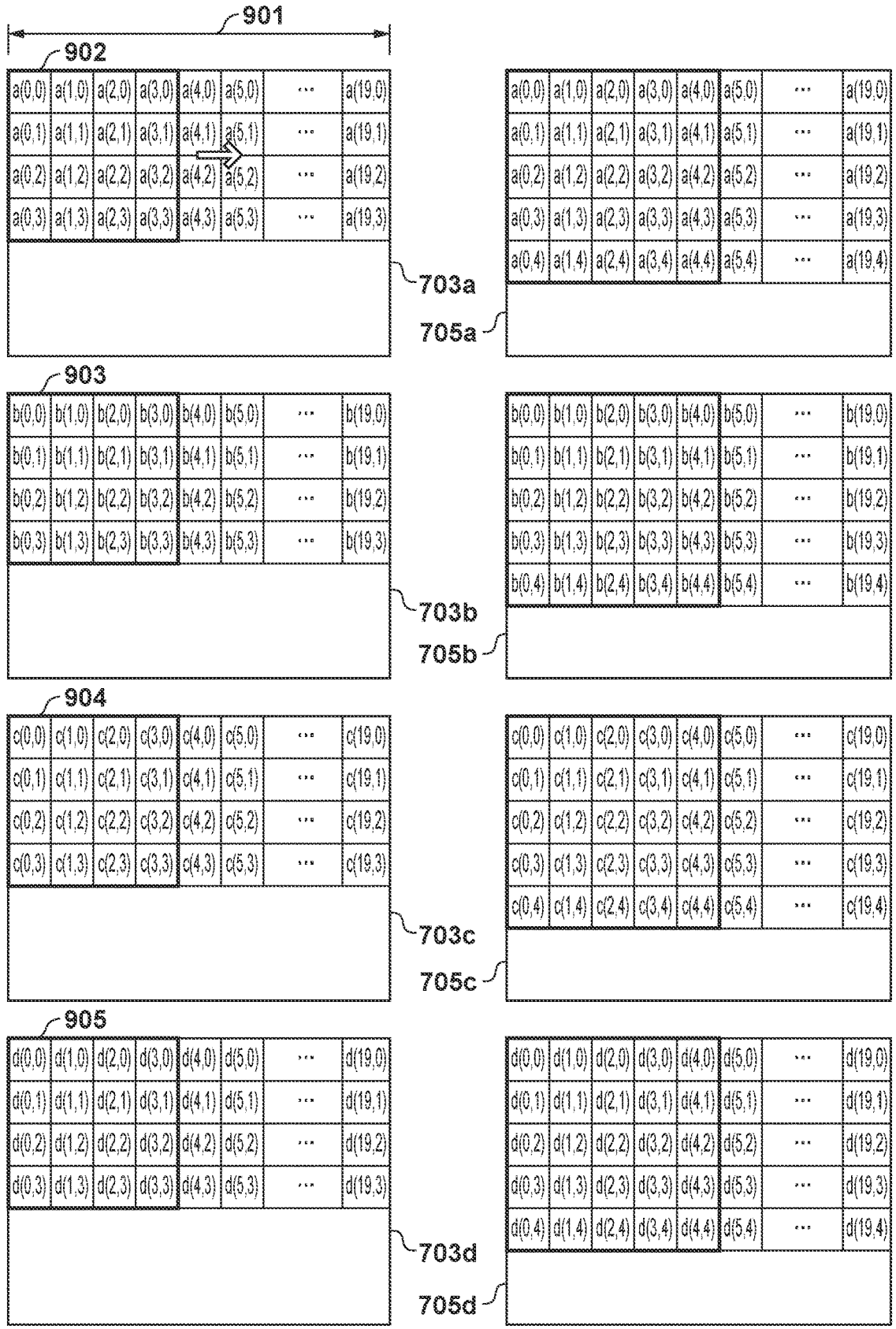
FIG. 9 is a view showing feature planes 703*a* to 703*d* in a first layer 708, feature planes 705*a* to 705*d* in a second layer 709, and regions stored in an intermediate buffer.
Figure 10:
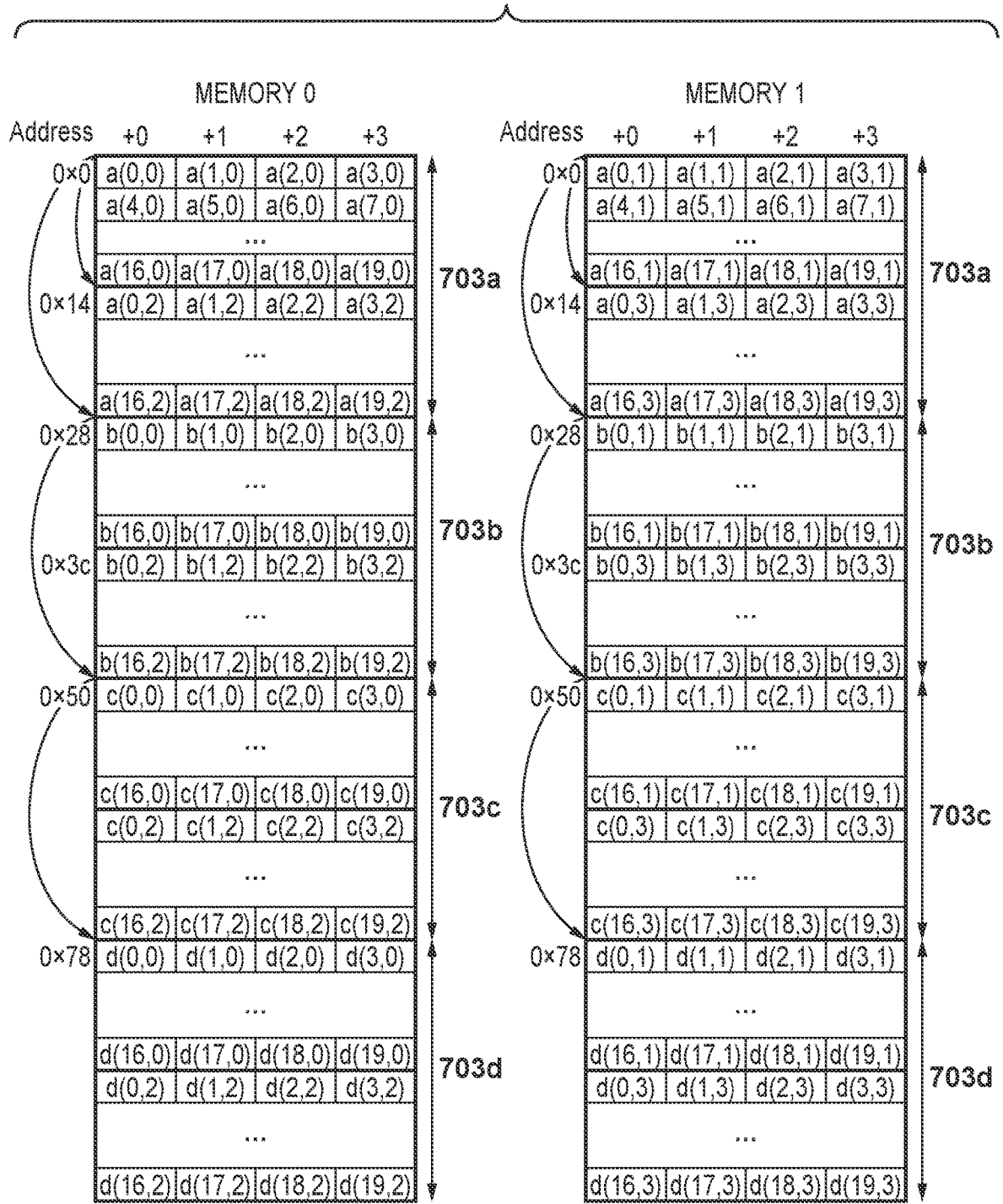
FIG. 10 is a view showing a 4-line data storage method in the intermediate buffer formed by two SRAMs.
Figure 11:
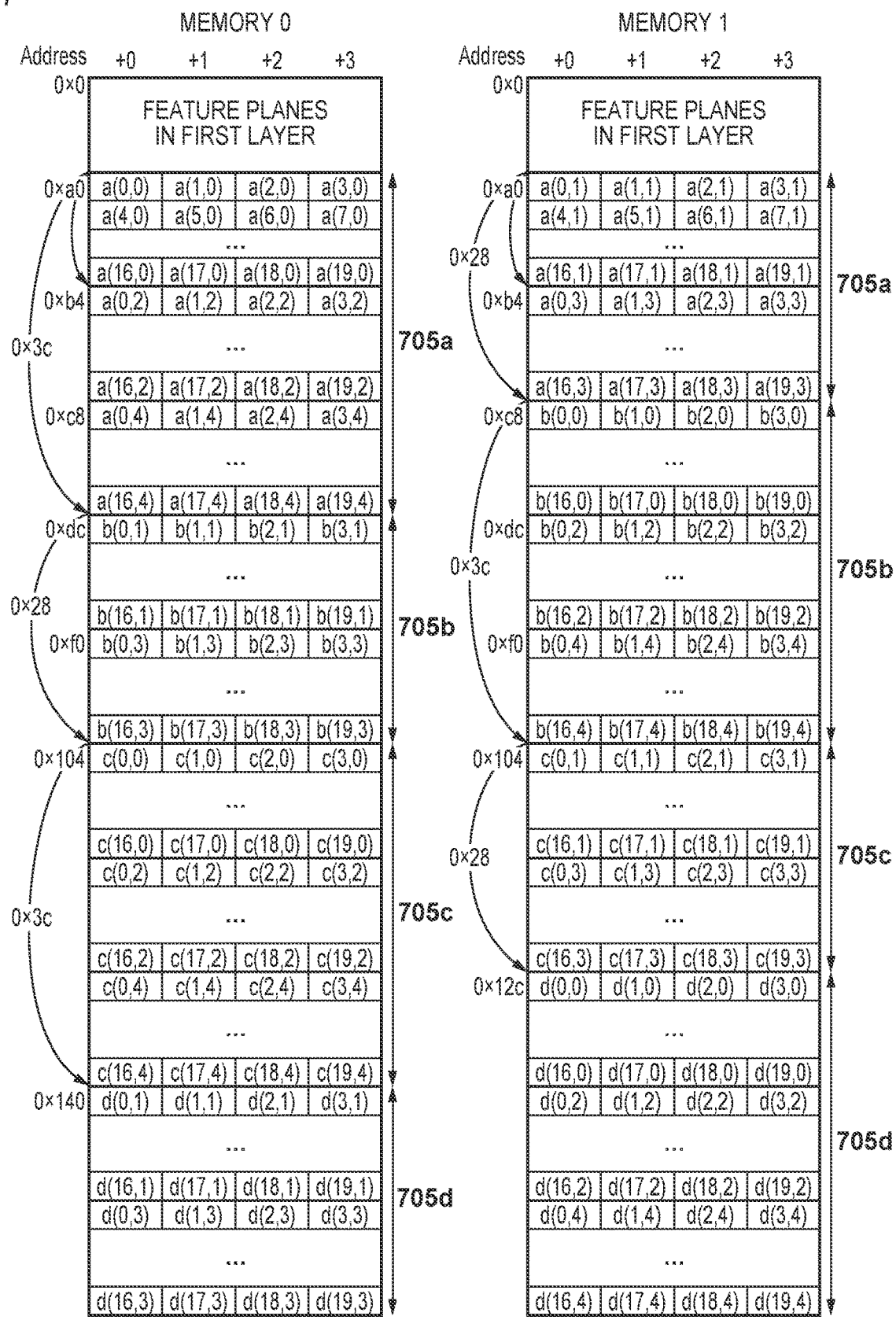
FIG. 11 is a view showing a 5-line data storage method in the intermediate buffer formed by the two SRAMs.

Next, an operation for generating the feature planes 703a to 703d, 705a to 705d, and 707 in the intermediate layers by performing convolution operations for the image data as the input layer shown in FIG. 7 in the image processing system shown in FIG. 1 will be described.

Figure 4:
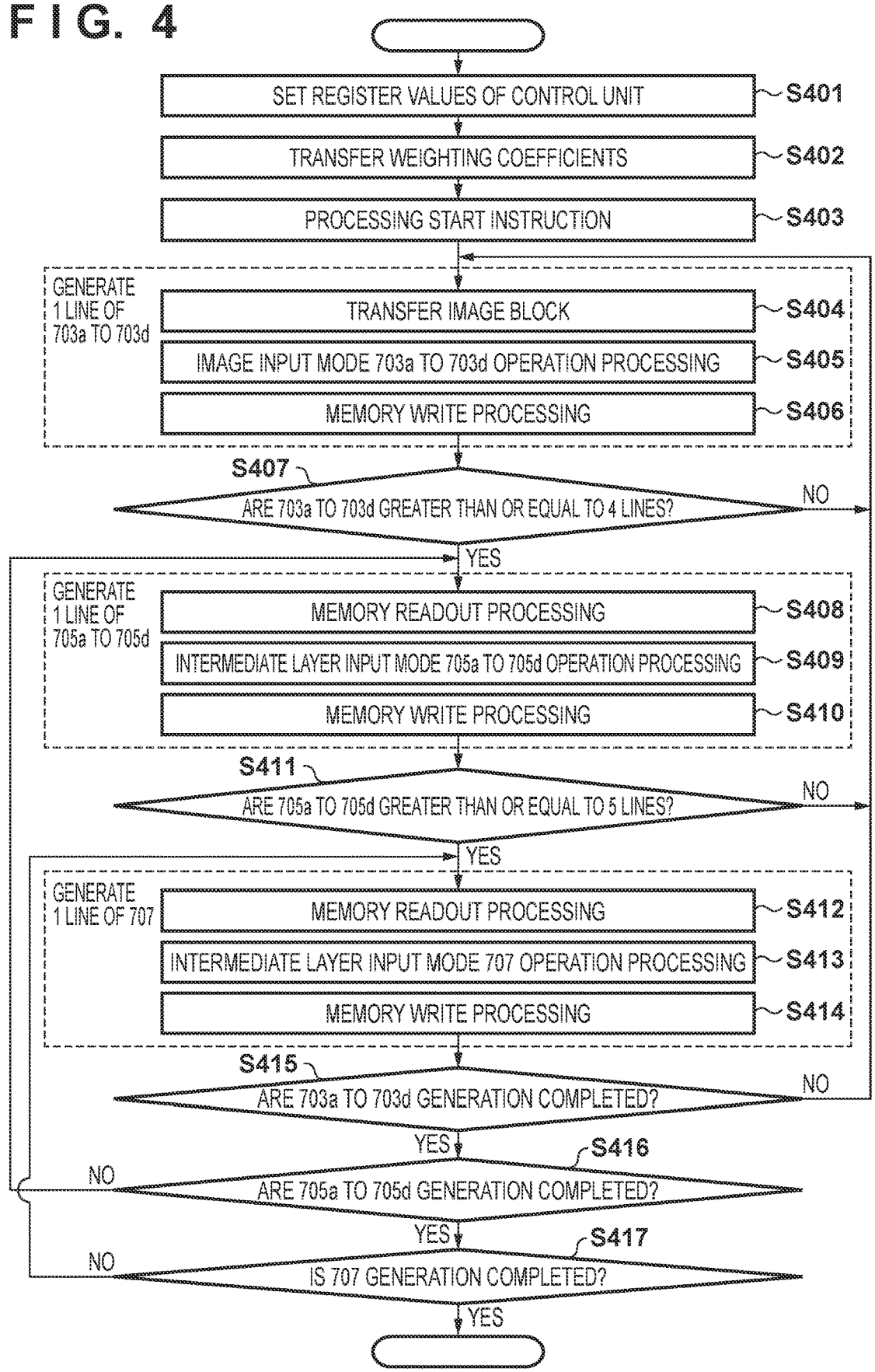
FIG. 4 is a flowchart of processing concerning the operation of the CNN processing unit 601.

Processing concerning the operation of the CNN processing unit 601 will be described with reference to a flowchart shown in FIG. 4.

In step S401, the CPU 606 sets register values in the operation setting register of the control unit 105 of the CNN processing unit 601. As the register values, information of the feature planes 703a to 703d in the first layer 708, information of the feature planes 705a to 705d in the second layer 709, information of the feature plane 707 in the third layer 710, and information of connection between the layers are set as follows. Note that the following register values are merely examples, and the present invention is not limited to them. Note that the start address in the intermediate buffer in which the feature plane is arranged is always memory 0.

<First Layer 708>
Width of feature plane: 20
The number of feature planes: 4
Start address in intermediate buffer in which feature plane is arranged: 0×0
The number of lines in intermediate buffer: 4 lines
<Second Layer 709>
Width of feature plane: 20
The number of feature planes: 4
Start address in intermediate buffer in which feature plane is arranged: 0×a0
The number of lines in intermediate buffer: 5 lines
<Third Layer 710>
Width of feature plane: 20
The number of feature planes: 1
Start address in intermediate buffer in which feature plane is arranged: 0×a0
<Convolution Kernel Size Used for Operation of Second Layer>
4×4
<Convolution Kernel Size Used for Operation of Third Layer>
5×5

Next, in step S402, the CPU 606 activates the DMAC 605, and transfers weighting coefficients to the convolution operation unit 101. The weighting coefficients transferred to the convolution operation unit 101 are all weighting coefficients used for the operations of the feature planes 703a to 703d, the feature planes 705a to 705d, and the feature plane 707.

Then, in step S403, the CPU 606 instructs the control unit 105 to start processing.

In step S404, the CPU 606 uses the DMAC 605 to transfer the image data as a processing target to the convolution operation unit 101. The image data input to the convolution operation unit 101 is transferred to the convolution operation unit 101 for each reference pixel block corresponding to the convolution kernel size used.

In step S405, the control unit 105 which has received the processing start instruction in step S403 sets the convolution operation unit 101 in an image input mode. Then, the convolution operation unit 101 performs an operation of the feature planes 703a to 703d for each coordinate point using the transferred image data and the weighting coefficient of convolution kernels 7021a to 7021d.

In step S406, the control unit 105 which has received the processing start instruction in step S403 transfers the number of operation target layer=1 and the y-coordinate=0 to the memory write control unit 103, and issues a processing start instruction. In response to this, the memory write control unit 103 performs the processing according to the flowchart shown in FIG. 2 to store one line of each of the feature planes 703a to 703d.

Practical addressing in the memory write processing in step S406 will now be described.

In step S201, the register values of the first layer 708 with the layer number=1 are referred to. Since the width of the feature plane is 20, the number of feature planes is 4, the start address in the intermediate buffer in which the feature plane is arranged is 0×0, and the number of lines in the intermediate buffer is 4, k=0, the channel offset Cofst=0×50, the write address WA=0×0, and the x-coordinate=0 are set. Furthermore, in step S202, the feature plane number is set to 1.

If data at the coordinates (0, 0) on the feature plane 703a is received first, 0 is selected, in step S204, as the memory number of the memory in which the data is written, and the data is stored at the address 0×0 in memory 0 in step S205. In step S206, the memory number of the memory in which the data of the next feature plane is written is set to 1, and the write address is not updated. Then, the feature plane number is incremented to wait for data.

Next, if data at the coordinates (0, 0) on the feature plane 703b is received, 1 is selected, in step S204, as the memory number of the memory in which the data is written, and the data is stored at the address 0×0 in memory 1 in step S205. The memory number of the memory in which the data of the next feature plane is written is set to 0 in step S206, and the write address is updated to 0×50 obtained by adding Cofst in step S208. Then, the feature plane number is incremented to wait for data.

Next, if data at the coordinates (0, 0) on the feature plane 703c is received, 0 is selected, in step S204, as the memory number of the memory in which the data is written, and the data is stored at the address 0×50 in memory 0 in step S205. The memory number of the memory in which the data of the next feature plane is written is set to 1 in step S206, and the write address is not updated. Then, the feature plane number is incremented to wait for data.

Data at the coordinates (0, 0) on the feature plane 703d, which is received next, is similarly stored at the address 0×50 in memory 1. At this time, since the feature plane number is 4 and it is determined in step S210 that "the feature plane number has reached the number of feature planes", the process advances to step S211, and the write address is updated, in step S211, to 0×1 obtained by incrementing the address 0×0 saved in step S202.

Subsequently, data at coordinates (1, 0) on the feature plane 703a, data at coordinates (1, 0) on the feature plane 703b, data at coordinates (1, 0) on the feature plane 703c, data at coordinates (1, 0) on the feature plane 703d are sequentially stored at the address 0×1 in memory 0, the address 0×1 in memory 1, an address 0×51 in memory 0, and the address 0×51 in memory 1, respectively.

Figures 1, 5A:
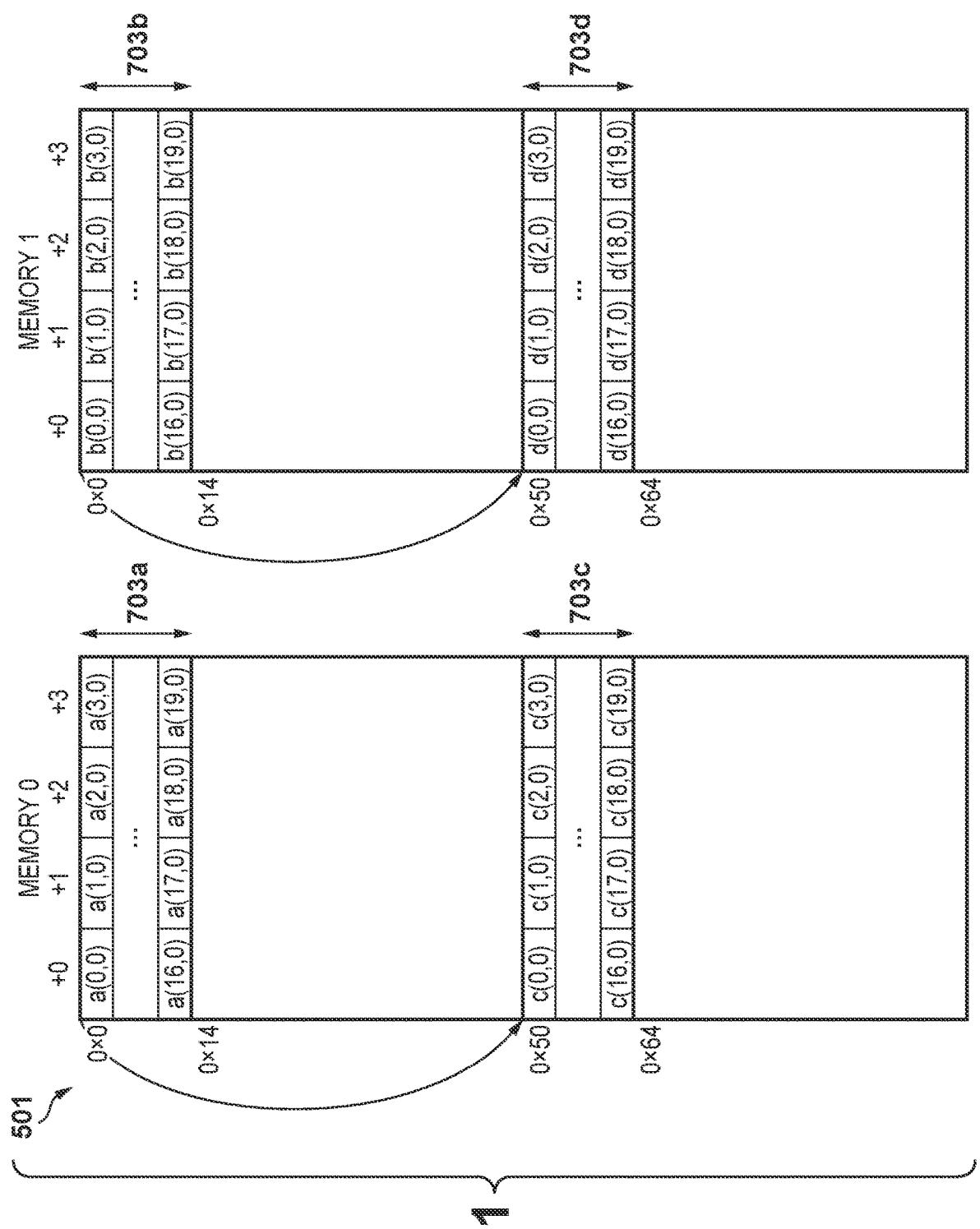
Figures 2, 5A:
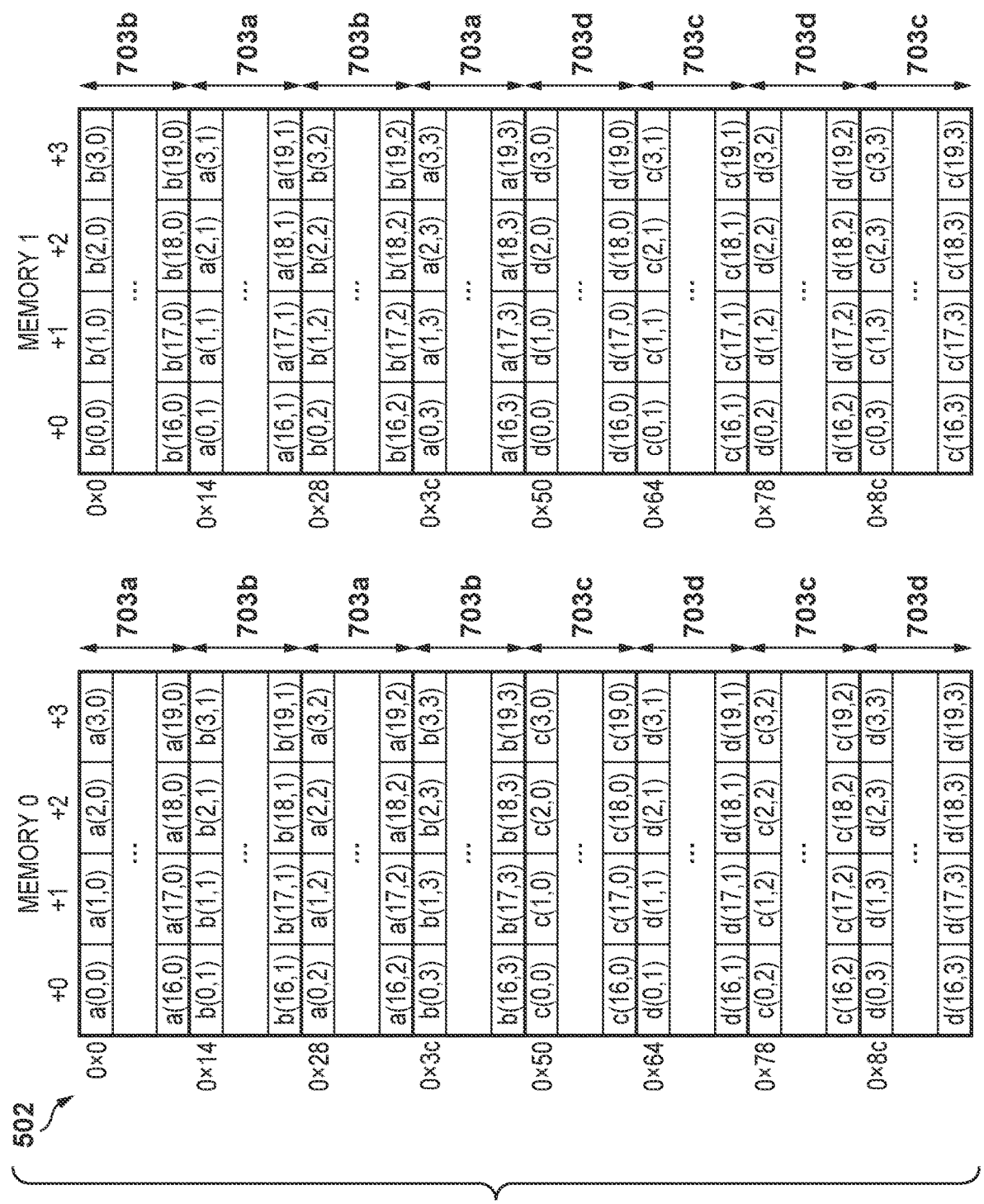

Then, the data write processing is performed while incrementing the x-coordinate until the x-coordinate reaches 19 in step S212. If the x-coordinate reaches 19, storage of one line ends, and thus the processing ends. At this time, data storage states in memories 0 and 1 are shown in 501 of FIG. 5A-1.

In the memory areas of the feature planes 703a and 703b, data at the same coordinates are stored at the same address in memories 0 and 1. In the memory areas of the feature planes 703c and 703d, data at the same coordinates are stored at the same address in memories 0 and 1. The data storage amounts of memories 0 and 1 are equal to each other.

If storage of one line ends in step S406, the control unit 105 determines in step S407 whether the feature planes 705a to 705d in the next layer can be processed. Since the convolution kernel size of each of the first layer 708 and the second layer 709 is 4×4, the processes in steps S404 to S406 are repeatedly executed until four lines are generated. At this time, the control unit 105 sequentially transfers the layer number of the operation target layer=1 and the y-coordinate=1, 2, 3 to the memory write control unit 103. When the write address WA=0×14, 0×28, 0×3c and the feature plane number=1 in step S201, the write memory number=1, 0, 1 is obtained in step S204. Therefore, the address 0×14 in memory 1, the address 0×28 in memory 0, and the address 0×3c in memory 1 are set as the start addresses of the lines of the feature plane number=1. Data storage states in memories 0 and 1 when storage of four lines ends are shown in 502 of FIG. 5A-2.

In the memory areas of the feature planes 703a and 703b, data at the same coordinates are stored at the same address in memories 0 and 1. In the memory areas of the feature planes 703c and 703d, data at the same coordinates are stored at the same address in memories 0 and 1. The channel offsets of each of memories 0 and 1 is 0×50.

If it is determined in step S407 that the processing is possible, the process advances to step S408. If it is determined in step S407 that the processing is possible, one line of each of the feature planes 705a to 705d is processed. In step S408, the control unit 105 transfers the layer number of the operation target layer=2 and the y-coordinate=0 to the memory readout control unit 104, and gives a processing start instruction. Then, the memory readout control unit 104 reads out the intermediate layer data in accordance with the flowcharts shown in FIGS. 3A and 3B, and transmits it to the convolution operation unit 101. The readout intermediate layer data has the intermediate layer number=1 as the number of the preceding layer of the operation target. The reference pixel block size is decided by the convolution kernel size of 4×4 used for the operation of the second layer 709.

Practical addressing in the memory readout processing in step S408 will now be described. In step S301, the register values of the first layer 708 with the layer number=1 are referred to. Since the width of the feature plane is 20, the number of feature planes is 4, the start address in the intermediate buffer in which the feature plane is arranged is 0×0, and the number of lines in intermediate buffers is 4, k=0, Cofst=0×50, the read address RA=0×0, and the x-coordinate=0 are set. Furthermore, the feature plane number is set to 1 in step S302, and the reference pixel line number is set to 0 in step S303.

In step S304, since k=0 and the feature plane number is 1, 0 is selected as the memory number of the start memory of the readout region. In step S305, since the reference pixel line number is 0, the number of memories is 2, and rowSize of the convolution kernel used for the operation of the second layer 709 is 4, the process advances to step S306 and num_loop=2 is set.

In step S308, 4-byte data is read out from the address RA[0]=0×0 in memory 0, and the readout data is set as data of the first reference pixel line. Subsequently, 4-byte data is read out from RA[1]=0×14, the readout data is set as data of the second reference pixel line, and the data of the two lines are transmitted in step S309.

Then, in step S310, (width of feature plane×2) is added to the readout address, thereby updating the address to RA=0×28. In step S311, since rowSize is 4, it is determined that not all the reference pixel lines have been transmitted, the reference pixel line number row is incremented by two and thus updated to 2, thereby continuing the data readout processing. Since the memory number of the write memory remains 0, the address RA[0] in memory 0=0×28 and the address RA[1] in memory 1=0×3c are set in step S306. Since the reference pixel line number is 2, it is determined in step S305 that (current reference pixel line number row+the number of memories) is equal to or smaller than rowSize and the process advances to step S306 to set num_loop=2.

In step S308, 4-byte data is read out from each of the address 0×28 in memory 0 and the address 0×3c in memory 1. The data read out from memory 0 is set as data of the third reference pixel line and the data read out from memory 1 is set as data of the fourth reference pixel line, thereby transmitting the data of the two lines.

Since transmission of all the reference pixels is complete, the memory number of the start memory of the next readout region is decided in step S312. Since k=0 and the feature plane number is 1, the memory number is decided to be 1, and the read address is updated, in step S315, to 0×0 which is saved. Since the feature plane number=1, NO is determined in step S316, the feature plane number is incremented to obtain the feature plane number=2, and then the process returns to step S303.

In step S304, since k=0 and the feature plane number is 2, 1 is selected as the memory number of the start memory of the readout region, and the address RA[1] in memory 1=0×0 and the address RA[0] in memory 0=0×14 are set in step S310. Since the reference pixel line number is 0, 4-byte data is read out, in step S308, from each of the address 0×0 in memory 1 and the address 0×14 in memory 0. The data read out from memory 1 is set as data of the first reference pixel line and the data read out from memory 0 is set as data of the second reference pixel line, thereby transmitting the data of the two lines.

In step S310, (width of feature plane×2) is added to the read address, thereby updating the address to RA=0×28. Since rowSize is 4, NO is determined in step S311 and the reference pixel line number is incremented by two and thus updated to 2, thereby continuing the data readout processing. Subsequently, 4-byte data is read out, in step S318, from each of the address 0×28 in memory 1 and the address 0×3c in memory 0. The data read out from memory 1 is set as data of the third reference pixel line and the data read out from memory 0 is set as data of the fourth reference pixel line, thereby transmitting the data of the two lines.

Upon completion of transmission of all the reference pixels, the memory number of the start memory of the next readout region is decided in step S312. Since k=0 and the feature plane number is 2, the memory number is decided to be 0, and the read address is updated, in step S314, to 0×50 obtained by adding Cofst to 0×0 which is saved. Since the feature plane number=2, NO is determined in step S316, the feature plane number is incremented to obtain the feature plane number=3, and then the process returns to step S303.

Similarly, the processing of the feature plane number=3 reads out 4-byte data from each of the address 0×50 in memory 0 and the address 0×64 in memory 1. Then, the data read out from memory 0 is set as data of the first line and the data read out from memory 1 is set as data of the second line, thereby transmitting the data of the two lines.

Similarly, the processing of the feature plane number=4 reads out 4-byte data from each of the address 0×50 in memory 1 and the address 0×64 in memory 0. Then, the data read out from memory 1 is set as data of the first line and the data read out from memory 0 is set as data of the second line, thereby transmitting the data of the two lines.

If transfer of all the feature planes ends, YES is determined in step S316, and the read address RA is updated, in step S317, to 0×1 obtained by adding 1 to the address saved in step S302. After that, data is read out and transmitted while incrementing the x-coordinate until the x-coordinate reaches 19 in step S318. If the x-coordinate reaches 19, the readout processing of the reference pixels necessary to calculate one line ends, and thus the processing ends.

On the other hand, after the memory readout control unit 104 reads out the data in step S408, processing in step S409 is performed. In step S409, the convolution operation unit 101 performs an operation of the feature planes 705a to 705d for each coordinate point using the transferred intermediate layer data and the weighting coefficient of convolution kernels 7041a to 7041d, 7042a to 7042d, 7043a to 7043d, and 7044a to 7044d, and outputs an operation result.

In step S410, the layer number=2 and the y-coordinate=0 are transferred to the memory write control unit 103, and the received data and one line of each of the feature planes 705a to 705d are stored by the processing according to the flowchart shown in FIG. 2.

After the end of storage of one line, the control unit 105 determines in step S411 whether the feature plane 707 in the next layer can be processed. If it is determined that the feature plane 707 in the next layer cannot be processed, the process returns to step S404; otherwise, the process advances to step S412.

Figure 5B:
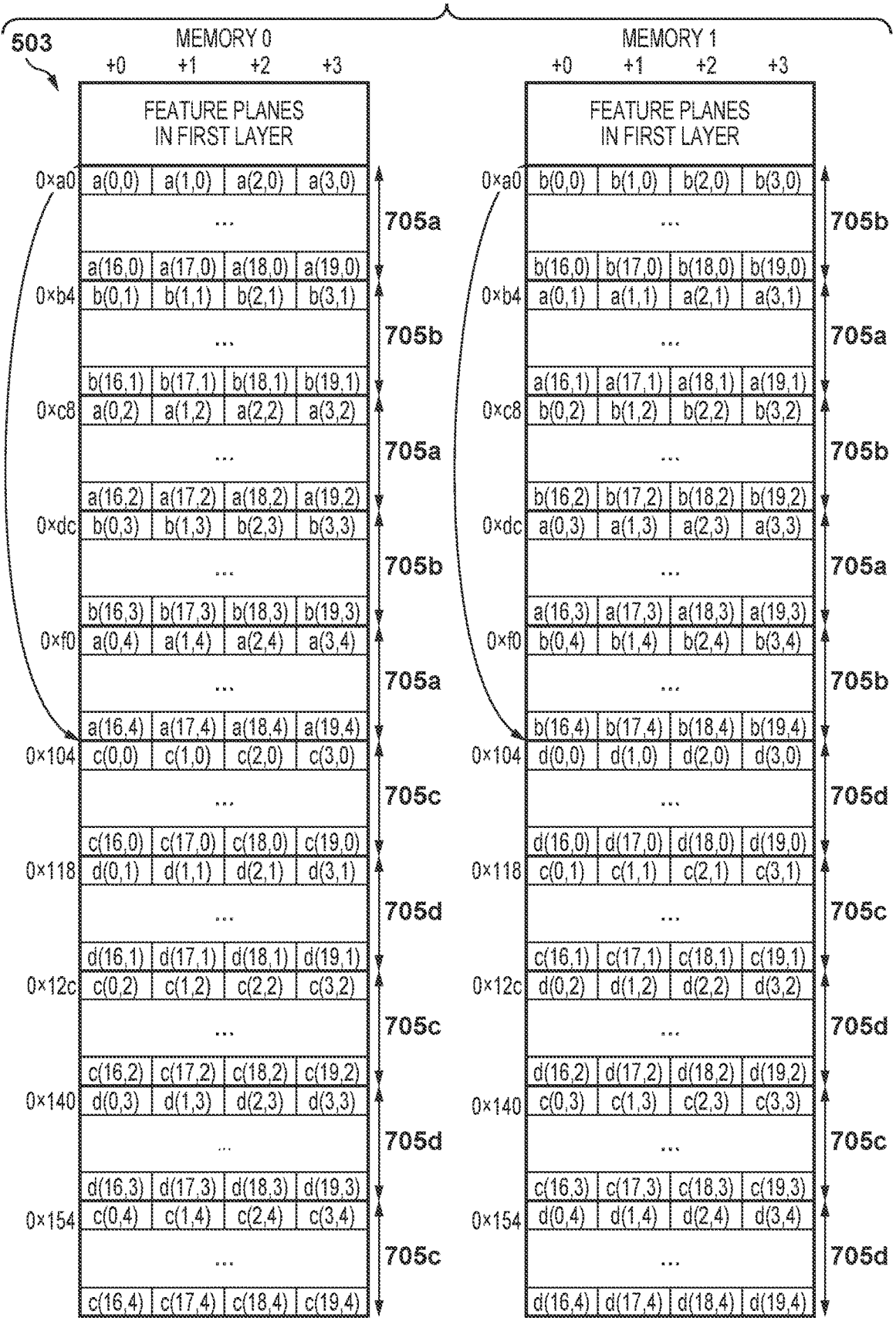
FIG. 5B is a view showing data storage states in memories 0 and 1.

Since the convolution kernel size of 5×5 is used, the processes in step S404 to S410 are repeatedly executed until five lines are generated. Storage states in memories 0 and 1 when storage of the five lines ends are shown in 503 of FIG. 5B.

In the memory areas of the feature planes 705a and 705b, data at the same coordinates are stored at the same address in memories 0 and 1. In the memory areas of the feature planes 705c and 705d, data at the same coordinates are stored at the same address in memories 0 and 1. The data storage amounts of memories 0 and 1 are equal to each other. In addition, the channel offset of each of memories 0 and 1 is 0×64.

In step S412, one line of the feature plane 707 is processed. If the control unit 105 transfers the layer number of the operation target layer=3 and the y-coordinate=0 to the memory readout control unit 104, and gives a processing start instruction, the memory readout control unit 104 performs the processing according to the flowcharts shown in FIGS. 3A and 3B. With this processing, the memory readout control unit 104 reads out the intermediate layer data, and transmits it to the convolution operation unit 101. The readout data has the layer number of the preceding layer of the operation target=2. The reference pixels are decided by the convolution kernel size of 5×5 used for the operation of the third layer 710.

After the memory readout control unit 104 reads out the data in step S412, the convolution operation unit 101 receives the intermediate layer data to perform operation processing of one line of the feature plane 707 in step S413.

In step S414, the memory write control unit 103 transfers the layer number=3 and the y-coordinate=0, and the received data and one line of the feature plane 707 are stored by the processing according to the flowchart shown in FIG. 2. In addressing of the memory write processing in step S414, the information of the feature plane in the third layer 710 is referred to as register values.

After the end of storage of one line, the control unit 105 determines in step S415 whether the feature planes 703a to 703d in the first layer are generated for the height of the convolution kernel size to be used for the operation of the second layer 709. If, as a result of the determination processing, it is determined that the feature planes 703a to 703d are not generated for the height of the convolution kernel size, the process returns to step S404, and one line of each of the feature planes 703a to 703d, 705a to 705d, and 707 is further generated. On the other hand, if it is determined in step S415 that the feature planes 703a to 703d are generated for the height of the convolution kernel size, the process advances to step S416.

In step S416, the control unit 105 determines whether the feature planes 705a to 705d in the second layer 709 are generated for the height of the convolution kernel size used for the operation of the third layer 710. If, as a result of the determination processing, that the feature planes 705a to 705d are not generated for the height of the convolution kernel size, the process returns to step S408, and one line of each of the feature planes 705a to 705d and 707 is further generated. On the other hand, if it is determined in step S416 that the feature planes 705a to 705d are generated for the height of the convolution kernel size, the process advances to step S417.

In step S417, the control unit 105 determines whether the feature plane 707 in the third layer 710 is generated for the height of the feature plane. If, as a result of the determination processing, that the feature plane 707 is not generated for the height of the feature plane, the process returns to step S412, and one line is further generated. On the other hand, if it is determined in step S417 that the feature plane 707 is generated for the height of the feature plane, the processing according to the flowchart shown in FIG. 4 ends.

As described above, according to this embodiment, when the intermediate buffer is formed by the plurality of memories, successive lines of the same feature plane are stored in the different memories, and data at the same coordinates of the plurality of feature planes are stored at the same address in the memories of the different memory numbers. This eliminates biasing of the data storage amounts depending on the convolution kernel sizes, and it is possible to implement high-speed readout processing and improve the memory use efficiency by easy addressing. Therefore, it is possible to reduce memory read cycles from the intermediate buffer, which occur in the operation of the intermediate layer data, and to reduce the memory capacity of the intermediate buffer and the circuit scale while improving the processing performance of the pattern recognition apparatus.

Second Embodiment

The difference from the first embodiment will be described below, and the rest is assumed to be the same as in the first embodiment unless it is specifically stated otherwise. The first embodiment has explained the example in which the feature plane is two-dimensional data. However, the number of dimensions of the data of the feature plane is not limited to two, and may be, for example, one or three.

Furthermore, the first embodiment has explained the example in which the number of memories as the intermediate buffer of the data holding unit 102 is two and the data of the four feature planes are arranged in the two memories. However, the number of memories and the number of feature planes are not limited to them.

Even when the number of feature planes is represented by N (N>1) and the number of memories is represented by M (M>1), the flowchart shown in FIG. 2 is applicable as the operation of a memory write control unit 103. Since, as indicated by steps S204 and S205, successive lines of the same feature plane are stored in the M different memories, it is possible to simultaneously read out M lines. Furthermore, as indicated by steps S206 to S209, data at the same coordinates of feature planes with feature plane numbers N, N+1, . . . , N+(M−1) are stored at the same write address in memories with different memory numbers. Therefore, when N mod M=0, equal data amounts are stored in the M memories regardless of the number of lines in an intermediate buffer, and it is thus possible to obtain the same effect as in the first embodiment.

The flowcharts shown in FIGS. 3A and 3B are also applicable as the operation of a memory readout control unit 104. As indicated by step S308, M successive lines of the same feature plane are simultaneously read out from the different memories. Addressing manages only one read address (RA), and the address in all the memories is decided by RA+width of feature plane×k×i (i=0, 1, . . . , the number of memories−1) in step S308 in accordance with a memory number calculated in step S304. Therefore, one addressing circuit is required, and it is thus possible to obtain the same effect as in the first embodiment.

The first embodiment has explained the example of performing operation processing in the feature plane order on a pixel basis, and then in the raster order. The present invention is not limited to this, and operation processing may be performed in the raster order and then in the feature plane order.

The operation of the memory write control unit 103 when performing operation processing in the raster order first will be described with reference to a flowchart shown in FIG. 12. Note that steps S1201 to S1205 are the same as steps S201 to S205 described above, respectively, and a description thereof will be omitted.

Upon completion of write of received data in step S1205, the next data moves in the raster order, and thus WA is incremented in step S1211. In step S1212, it is determined whether the x-coordinate has reached the width of the feature plane. When performing the processing in the raster order first, this step is performed before a step of determining, in step S1210, whether the feature plane number has reached the number of feature planes. The x-coordinate is incremented and processes in steps S1203 to S1205 and S1211 are executed until the x-coordinate reaches the width of the feature plane. If the x-coordinate reaches the width of the feature plane, the process advances to step S1206.

Steps S1206 and S1207 are the same as steps S206 and S207 described above, respectively, and a description thereof will be omitted. If the memory number of the memory in which data of the next feature plane is written is 0, the process advances to step S1208, and the write address is updated to a value obtained by adding a channel offset to a backup address saved in step S1202. If the memory number is 1, the process advances to step S1209, and the write address is returned to the backup address saved in step S1202.

In step S1210, it is determined whether the feature plane number has reached the number of feature planes. The feature plane number is incremented and the processes in steps S1202 to S1209 are executed until the feature plane number reaches the number of feature planes. If the feature plane number reaches the number of feature planes, the processing is completed.

Figure 12:
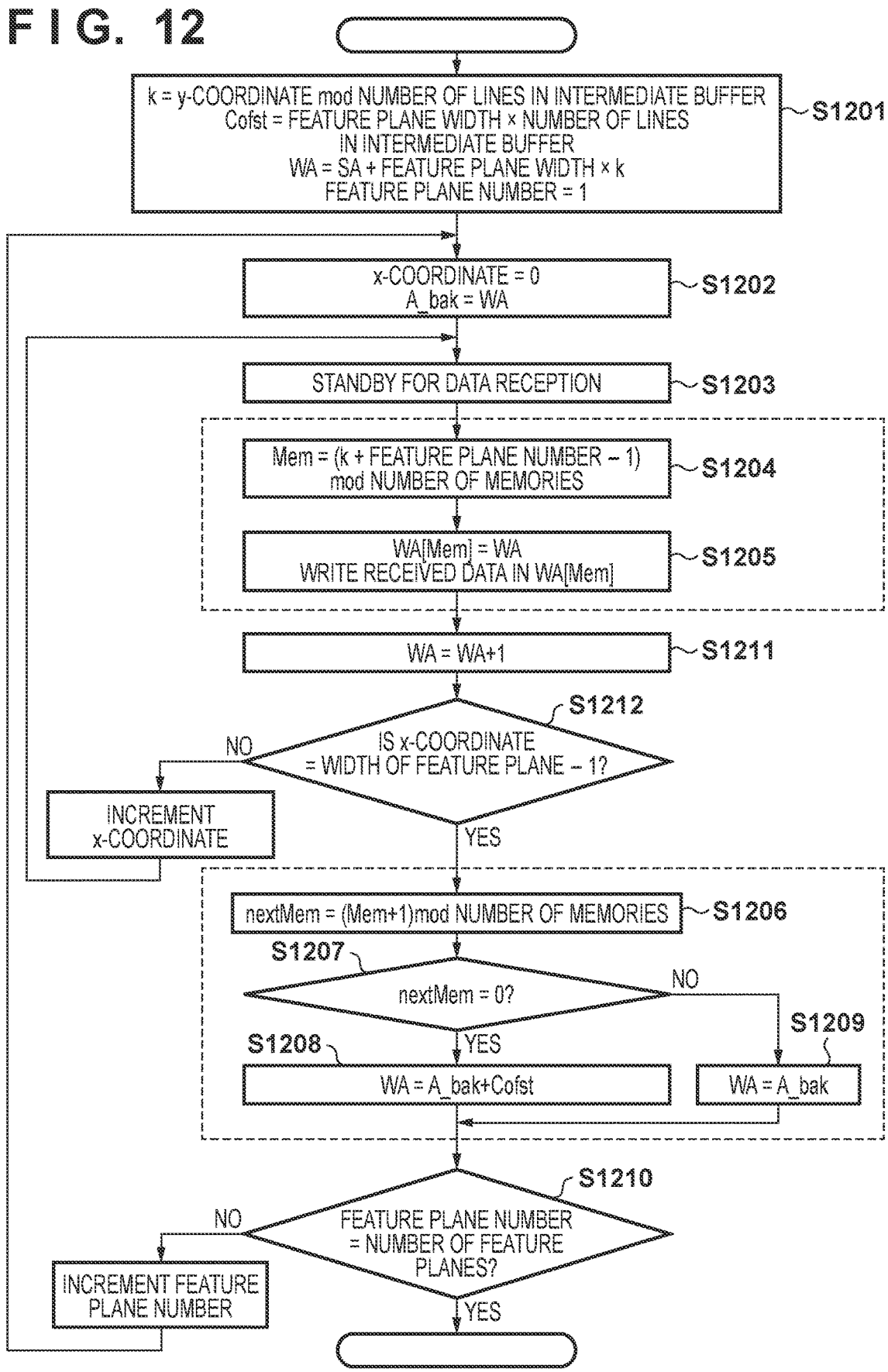
FIG. 12 is a flowchart of the operation of a memory write control unit 103 when performing operation processing in the raster order.

In the processing according to the flowchart shown in FIG. 12, even when performing the operation processing in the raster order, successive lines of the same feature plane are stored in the two different memories, as indicated by steps S1204 and S1205, and it is thus possible to simultaneously read out the two lines. Furthermore, as indicated by steps S1206 to S1209, data at the same coordinates of the feature planes with the feature plane numbers N and N+1 (N is an odd number) are stored at the same write address in the memories of the different memory numbers. Therefore, when the number of feature planes is a multiple of 2, equal data amounts are stored in the two memories regardless of the number of lines in the intermediate buffer.

The operation of the memory readout control unit 104 when performing operation processing in the raster order first will be described with reference to flowcharts shown in FIGS. 13A and 13B. Steps S1301 to S1311 are the same as steps S301 to S311 described above, respectively, and a description thereof will be omitted.

Upon completion of transmission of all reference pixel lines in step S1311, the next data moves in the raster order, and thus the read address is updated, in step S1317, to a value obtained by incrementing a backup address saved in step S1303.

In step S1318, it is determined whether the x-coordinate has reached the width of the feature plane. When performing the processing in the raster order first, this step is performed before a step of determining, in step S1316, whether the feature plane number has reached the number of feature planes. The x-coordinate is incremented and processes in steps S1303 to S1311 and S1317 are executed until the x-coordinate reaches the width of the feature plane. If the x-coordinate reaches the width of the feature plane, the process advances to step S1312.

Steps S1312 and S1313 are the same as steps S312 and S313 described above, respectively, and a description thereof will be omitted. If the memory number of the memory from which data of the next feature plane is read out is 0, the process advances to step S1314, and the read address is updated to a value obtained by adding the channel offset to a backup address saved in step S1302. If the memory number is 1, the process advances to step S1315, and the read address is returned to the backup address saved in step S1302.

In step S1316, it is determined whether the feature plane number has reached the number of feature planes. The feature plane number is incremented and the processes in steps S1302 to S1315 are executed until the feature plane number reaches the number of feature planes. If the feature plane number reaches the number of feature planes, the processing is completed.

Figure 13A:
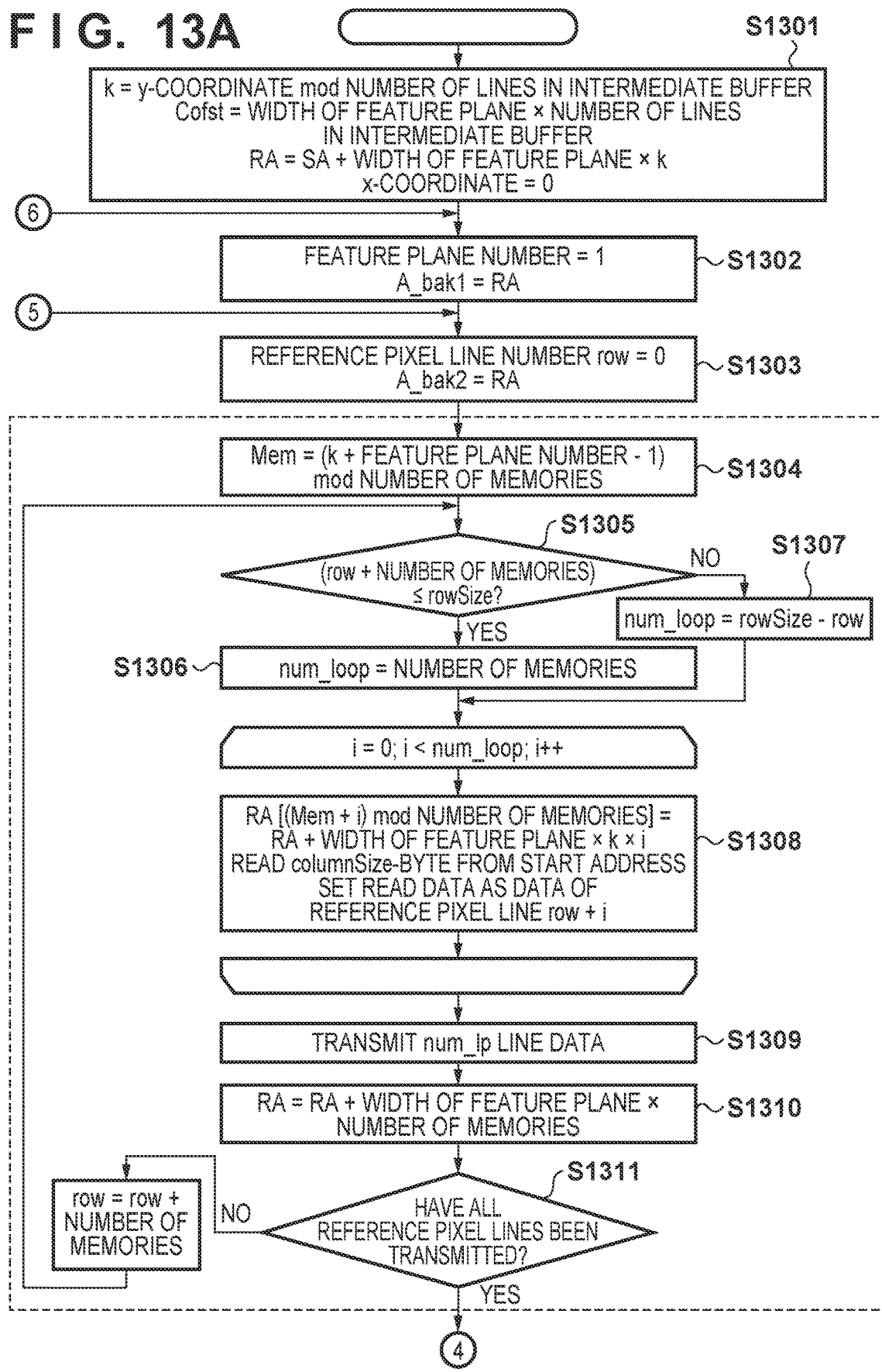

In the processing according to the flowcharts shown in FIGS. 13A and 13B, even when performing the operation processing in the raster order, two successive lines of the same feature plane are simultaneously read out from the different memories, as indicated by step S1308. Addressing manages only one read address (RA), and the address in all the memories is decided by RA+width of feature plane×k×i (i=0, 1, . . . , the number of memories−1) in step S1308 in accordance with a memory number calculated in step S1304. Therefore, one addressing circuit is required, and it is thus possible to obtain the same effect as in the first embodiment.

Note that each of the above-described embodiments has explained a case in which all the functional units shown in FIG. 1 are implemented by hardware. However, some (the memory readout control unit 104, the memory write control unit 103, the convolution operation unit 101, and the like) of the functional units shown in FIG. 1 may be implemented by software (a computer program). In this case, this computer program is stored in the memory in the CNN processing unit 601, the RAM 608, the ROM 607, or the like, and executed by the CPU 606 or the control unit 105, thereby making it possible to implement the functions of the corresponding functional units.

Note that the practical numerical values used in the above description are used to make a detailed description, and each of the above-described embodiments is not limited to these numerical values. Note that some or all of the above-described embodiments may appropriately be combined. In addition, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-127080, filed Jul. 8, 2019, which is hereby incorporated by reference herein in its entirety.

What is claimed is:

1. An operation processing apparatus for calculating a plurality of feature planes, which includes data corresponding to coordinates in a plurality of layers, by hierarchically performing filter operation processing for input image data, comprising:

an operation unit configured to perform a convolution operation;

a data holding unit including a plurality of memories configured to store image data and an operation result of the operation unit;

a memory write control unit configured to receive the operation result output from the operation unit, and then write, out of the received operation result, the data of successive lines of each feature plane being a part of the plurality of feature planes in a first set of different memories of the plurality of memories and write the data at the same coordinates of different feature planes being a part of the plurality of feature planes in each layer being a part of the plurality of layers in a second set of different memories of the plurality of memories; and a memory readout control unit configured to read out the data of the successive lines of each feature plane being a part of the plurality of feature planes from the first set of different memories of the data holding unit, read out the data at the same coordinates of different feature planes being a part of the plurality of feature planes in each layer being a part of the plurality of layers from the second set of different memories of the data holding unit, and then transmit both of the read out data to the operation unit.

2. The apparatus according to claim 1, wherein the filter operation processing can set, for each layer being a part of the plurality of layers, a kernel size used for convolution to an arbitrary value.

3. The apparatus according to claim 1, wherein the filter operation processing can set, for each layer being a part of the plurality of layers, the number of lines of each feature plane being a part of the plurality of feature planes stored in the data holding unit to an arbitrary value.

4. The apparatus according to claim 1, wherein when the number of memories forming the data holding unit is represented by M (M>1) and the number of different feature planes being a part of the plurality of feature planes in a layer being a part of the plurality of layers is represented by N (N>1), if N mod M=0, the memory write control unit groups the M feature planes, and stores, at the same address in different memories, data at the same coordinates of the feature planes in the same group.

5. The apparatus according to claim 1, wherein the first set of different memories and the second set of different memories are the same set of different memories, or are different sets of different memories.

6. An operation processing method for an operation processing apparatus that calculates a plurality of feature planes, which includes data corresponding to coordinates in a plurality of layers, by hierarchically performing filter operation processing for input image data, the method comprising:

causing an operation unit of the operation processing apparatus to perform a convolution operation;

causing a memory write control unit of the operation processing apparatus to receive an operation result output from the operation unit, and then write, out of the received operation result, the data of successive lines of each feature plane being a part of the plurality of feature planes in a first set of different memories of a plurality of memories that store image data and the operation result of the operation unit and write the data at the same coordinates of different feature planes being part of the plurality of feature planes in each layer being a part of the plurality of layers in a second set of different memories of the plurality of memories; and causing a memory readout control unit of the operation processing apparatus to read out the data of the successive lines of each feature plane being a part of the plurality of feature planes from the first set of different memories of the plurality of memories, read out the data at the same coordinates of different feature planes being a part of the plurality of feature planes in each layer being a part of the plurality of layers from the second set of different memories of the plurality of memories, and then transmit both of the read out data to the operation unit.

7. A non-transitory computer-readable storage medium storing a computer program for causing, a computer of an operation processing apparatus that calculates a plurality of feature planes, which includes data corresponding to coordinates in a plurality of layers, by hierarchically performing filter operation processing for input image data, to execute an operation processing method, the method comprising:

an operation unit configured to perform a convolution operation;

a data holding unit including a plurality of memories configured to store image data and an operation result of the operation unit;

a memory write control unit configured to receive the operation result output from the operation unit, and then write, out of the received operation result, the data of successive lines of each feature plane being a part of the plurality of feature planes in a first set of different memories of the plurality of memories and write the data at the same coordinates of different feature planes being a part of the plurality of feature planes in each layer being a part of the plurality of layers in a second set of different memories of the plurality of memories; and a memory readout control unit configured to read out the data of the successive lines of each feature plane being a part of the plurality of feature planes from the first set of different memories of the data holding unit, read out the data at the same coordinates of different feature planes being a part of the plurality of feature planes in each layer being a part of the plurality of layers from the second set of different memories of the data holding unit, and then transmit both of the read out data to the operation unit.

* * * * *